US012800771B2

(12) United States Patent
Peng et al.

(10) Patent No.: US 12,800,771 B2

(45) Date of Patent: Nov. 17, 2026

(54) MISSING SSR HANDLING WITH URA

(71) Applicant: QUALCOMM Incorporated, San Diego, CA (US)

(72) Inventors: Yuxiang Peng, Sunnyvale, CA (US); Ning Luo, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 18/454,561

(22) Filed: Aug. 23, 2023

(65) Prior Publication Data

US 2025/0067876 A1 Feb. 27, 2025

(51) Int. Cl.
*G01S 19/07* (2010.01)
*G01S 19/40* (2010.01)

(52) U.S. Cl.
CPC ............ *G01S 19/072* (2019.08); *G01S 19/40* (2013.01)

(58) Field of Classification Search
CPC ............................... G01S 19/072; G01S 19/40
See application file for complete search history.

(56) References Cited

U.S. PATENT DOCUMENTS

| | | | | |
|---|---|---|---|---|
| 2010/0194634 A1 | 8/2010 | Biacs et al. | | |
| 2023/0184956 A1* | 6/2023 | Cole | G01S 19/071 | 342/352 |
| 2024/0151856 A1* | 5/2024 | Parkins | G01S 19/07 | |
| 2024/0201392 A1* | 6/2024 | Brocard | G01S 19/08 | |
| 2024/0406685 A1* | 12/2024 | Lee | H04W 4/12 | |

FOREIGN PATENT DOCUMENTS

| | | | |
|---|---|---|---|
| CN | 111123295 A * | 5/2020 | G01S 19/07 |
| CN | 116438474 A * | 7/2023 | G01S 19/44 |
| WO | 2009129346 | 10/2009 | |

OTHER PUBLICATIONS

CN111123295Atranslation.pdf, machine translation of CN-111123295-A (Year: 2020).*

CN116438474Atranslation.pdf, machine translation of CN-116438474-A (Year: 2023).*

International Search Report and Written Opinion—PCT/US2024/043161—ISA/EPO—Dec. 11, 2024—11 pages.

* cited by examiner

*Primary Examiner* — Resha Desai
*Assistant Examiner* — Kenneth W Good
(74) *Attorney, Agent, or Firm* — Procopio, Cory, Hargreaves & Savitch LLP

(57) ABSTRACT

A method for wireless communication at a GNSS is described herein. The method includes obtaining a set of SSR error correction components associated with a set of SVs, where the set of SSR error correction components includes a first number of SSR error correction components that is less than a second number of SSR error correction components in a full set of SSR error correction components. The method includes generating, based on the set of SSR error correction components, (1) an OSR of GNSS measurements associated with the set of SVs and (2) an OSR uncertainty value for the OSR. The method includes computing, based on the OSR of the GNSS measurements and the OSR uncertainty value, a position of the GNSS wireless device. The method includes outputting an indication of the position of the GNSS wireless device.

27 Claims, 15 Drawing Sheets

MISSING SSR HANDLING WITH URA

TECHNICAL FIELD

The present disclosure relates generally to communication systems, and more particularly, to global navigation satellite system (GNSS) error correction.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a global navigation satellite system (GNSS) wireless device are provided. The apparatus includes at least one memory; and at least one processor coupled to the at least one memory and, based at least in part on information stored in the at least one memory, the at least one processor, individually or in any combination, is configured to: obtain a set of state-space representation (SSR) error correction components associated with a set of space vehicles (SVs), where the set of SSR error correction components includes a first number of SSR error correction components that is less than a second number of SSR error correction components in a full set of SSR error correction components; generate, based on the set of SSR error correction components, (1) an observation-space representation (OSR) of GNSS measurements associated with the set of SVs and (2) an OSR uncertainty value for the OSR; compute, based on the OSR of the GNSS measurements and the OSR uncertainty value, a position of the GNSS wireless device; and output an indication of the position of the GNSS wireless device.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
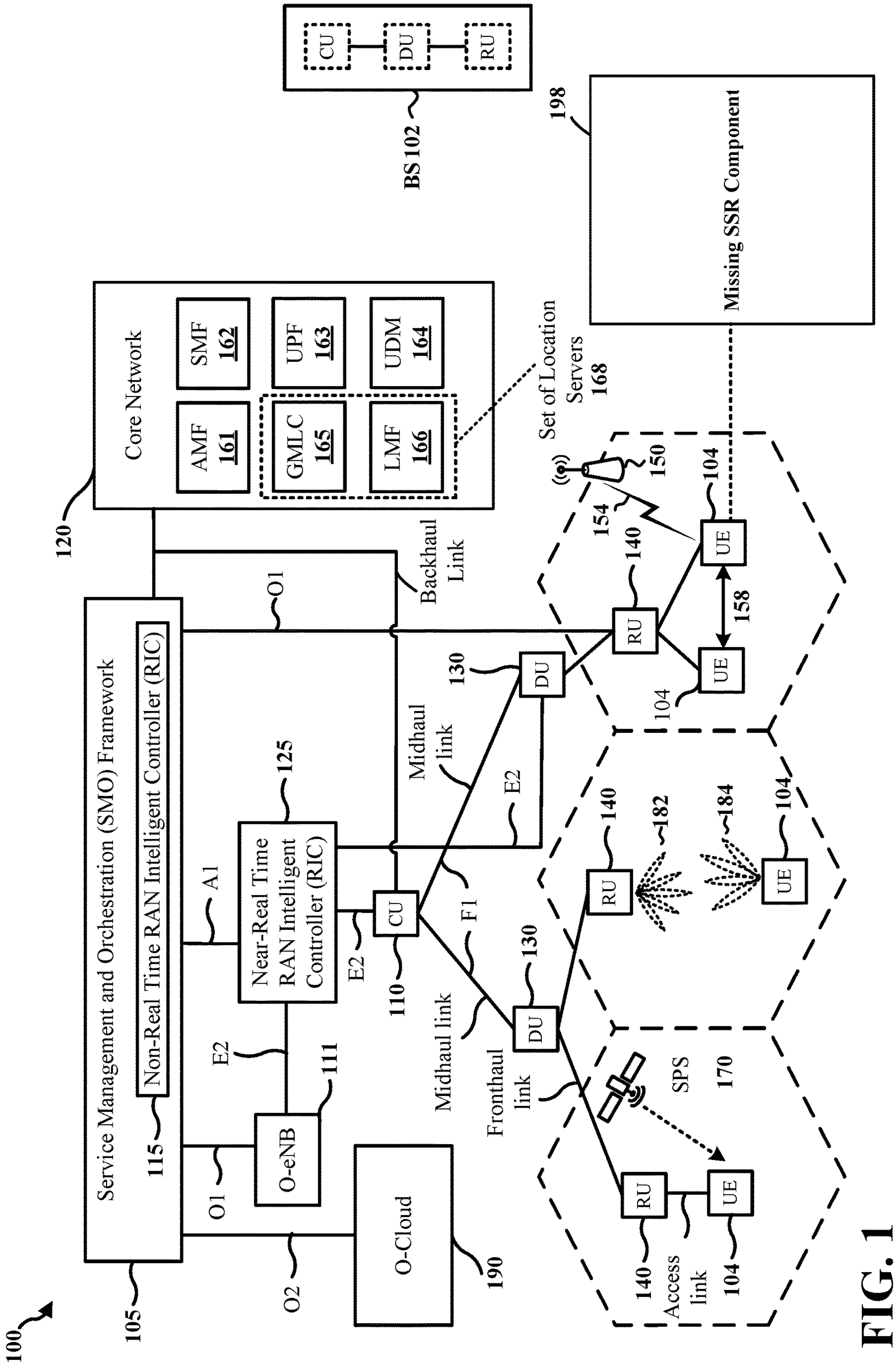
FIG. 1 is a diagram illustrating an example of a wireless communications system and an access network.

A global navigation satellite system (GNSS) may refer to a system that uses satellites (i.e., space vehicles (SVs)) to provide positioning, navigation, and timing (PNT) services to GNSS wireless devices (e.g., user equipments (UEs)) on a global or regional basis. The SVs may transmit signals that may be received by a GNSS wireless device, the GNSS wireless device may measure the signals, and the GNSS wireless device may compute its position on a celestial body (e.g., the Earth) based on the measured signals and other information. The computed position may be subject to various errors caused by the SVs and/or the Earth's atmosphere. The GNSS wireless device may be provided with error correction data that the GNSS wireless device may use to correct the computed position so as to increase an accuracy of the computed position. Examples of error correction data may include state-space representation (SSR) error correction components and an observation-space representation (OSR). SSR error correction components may represent errors that affect positioning as parameters of state vectors, while the OSR may be a "lump sum" of error components represented in observation space. In some cases, a full set of SSR error correction components may not be available to a GNSS wireless device due to a data service outage or a data traffic outage. The GNSS wireless device may wait until a full set of SSR error correction components are available. This approach may be suitable for positioning applications that allow for postprocessing and/or allow for a long convergence time. However, this approach may not be suitable for positioning applications that do not allow for a long convergence time Various technologies pertaining to missing SSR handling with user range accuracy (URA) are described herein. With more particularity, in one aspect, a GNSS wireless device may generate an OSR with available SSR error correction components and the GNSS wireless device may generate an OSR uncertainty value with a relatively high inflated URA value. In another aspect, a GNSS wireless device may generate the OSR with available SSR error correction components and SSR modelling and the GNSS wireless device may generate an OSR uncertainty value with a relatively lower inflated URA value. The SSR modelling may be data-free (i.e., empirical/physical modeling) in order to compensate for full uncertainty or the SSR modelling may be data-based (e.g., using an SSR data streaming trend (prediction using polynomial fitting) presurvey with a precise product).

In an example, a GNSS wireless device obtains a set of SSR error correction components associated with a set of SVs, where the set of SSR error correction components includes a first number of SSR error correction components that is less than a second number of SSR error correction components in a full set of SSR error correction components. The GNSS wireless device generates, based on the set of SSR error correction components, (1) an OSR of GNSS measurements associated with the set of SVs and (2) an OSR uncertainty value for the OSR. The GNSS wireless device computes, based on the OSR of the GNSS measurements and the OSR uncertainty value, a position of the GNSS wireless device. The GNSS wireless device outputs an indication of the position of the GNSS wireless device. Vis-à-vis generating, based on the set of SSR error correction components, (1) the OSR of GNSS measurements associated with the set of SVs and (2) the OSR uncertainty value for the OSR, the GNSS wireless device may be able to ascertain its position in a relatively faster manner compared to a GNSS wireless device that skips OSR generation. For instance, the GNSS wireless device may perform precise point positioning (PPP) and/or real-time kinematic positioning (RTK) in a relatively fast manner using the generated OSR.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU. DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHz), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a missing SSR component 198 that may be configured to obtain a set of SSR error correction components associated with a set of SVs, where the set of SSR error correction components includes a first number of SSR error correction components that is less than a second number of SSR error correction components in a full set of SSR error correction components; generate, based on the set of SSR error correction components, (1) an OSR of GNSS measurements associated with the set of SVs and (2) an OSR uncertainty value for the OSR; compute, based on the OSR of the GNSS measurements and the OSR uncertainty value, a position of the GNSS wireless device; and output an indication of the position of the GNSS wireless device. Although the following description may be focused on a GNSS wireless device, the concepts presented herein may also be applicable to other types of wireless devices.

Figures 2A, 2B, 2C, 2D:
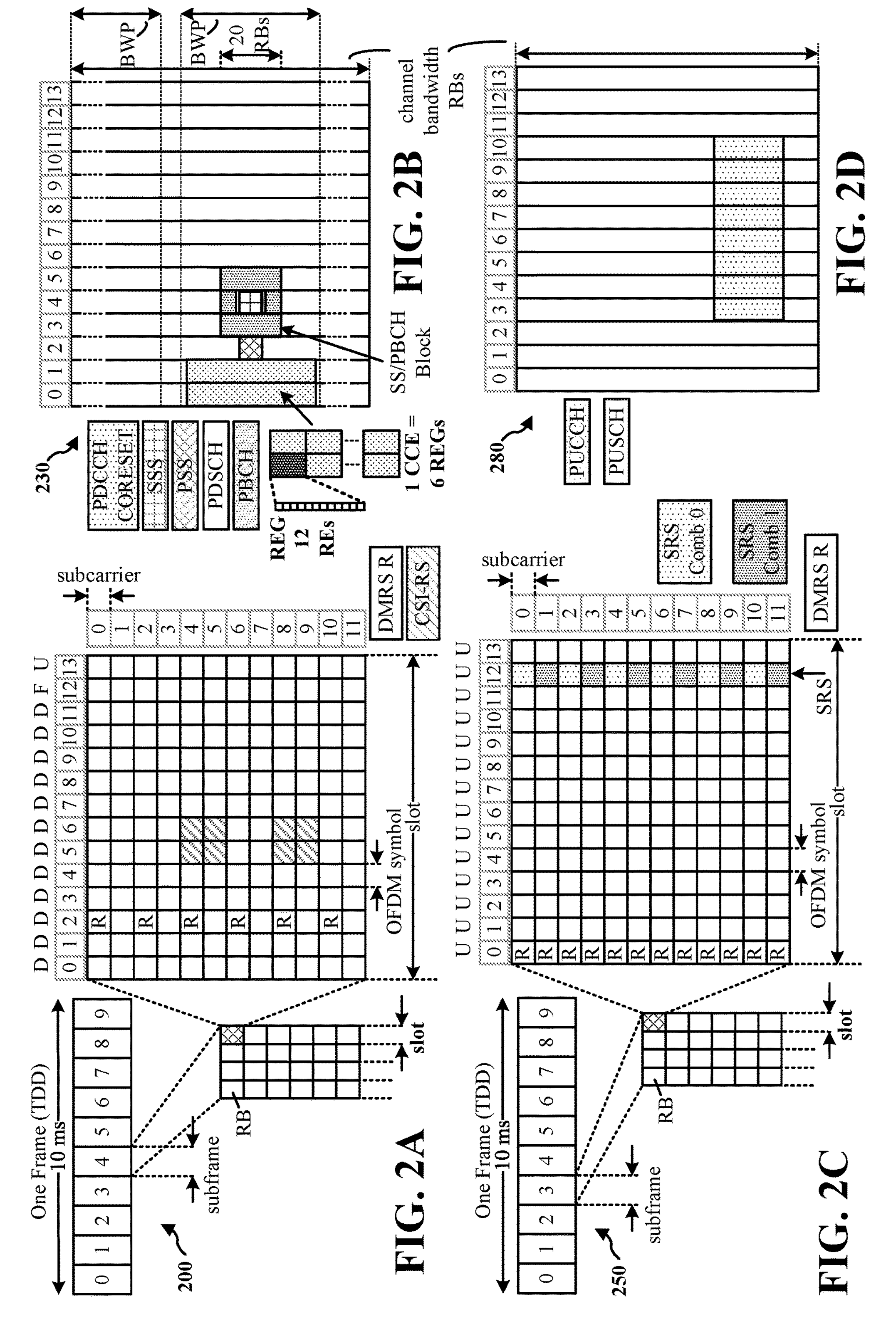
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
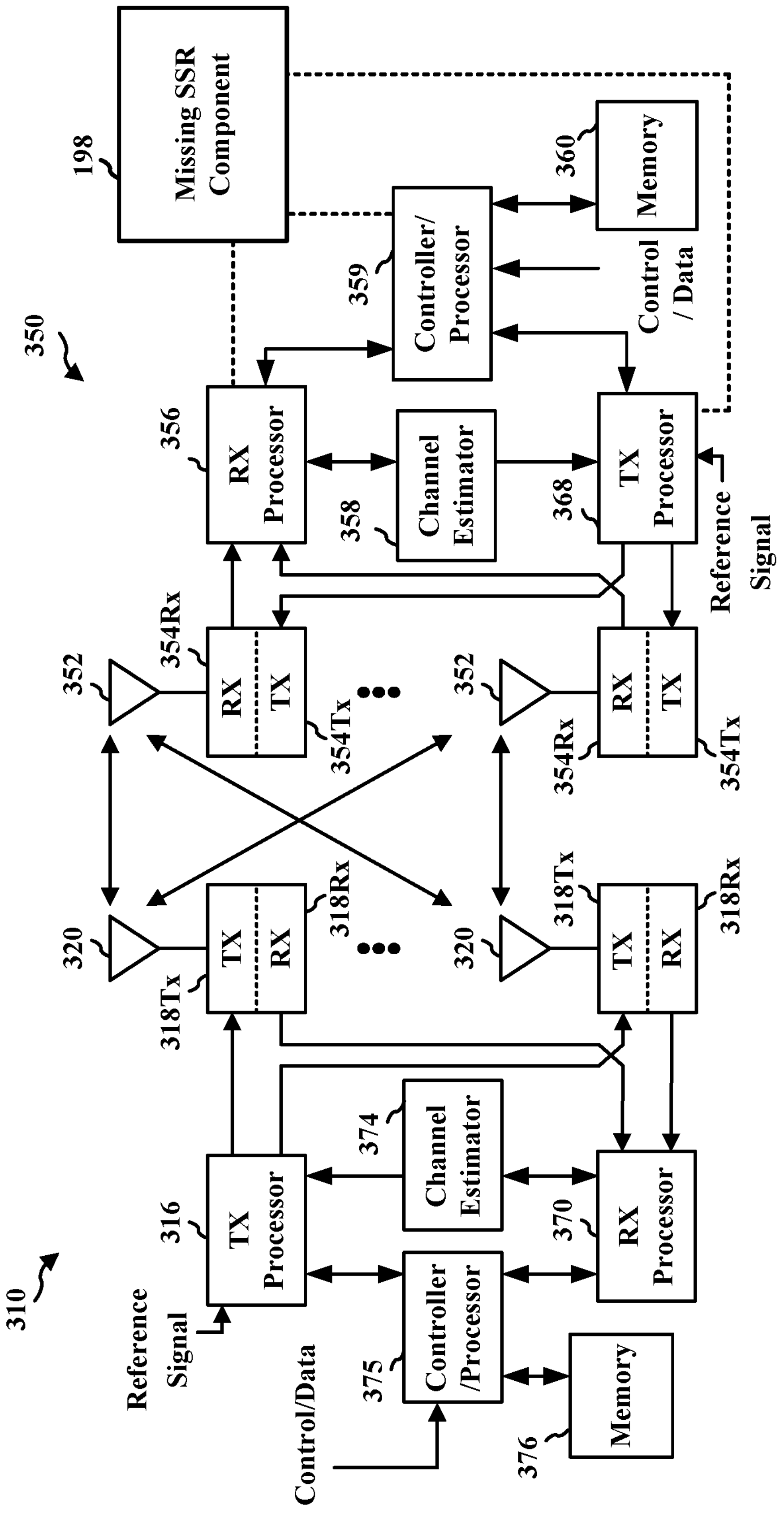
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the missing SSR component 198 of FIG. 1.

Figure 4:
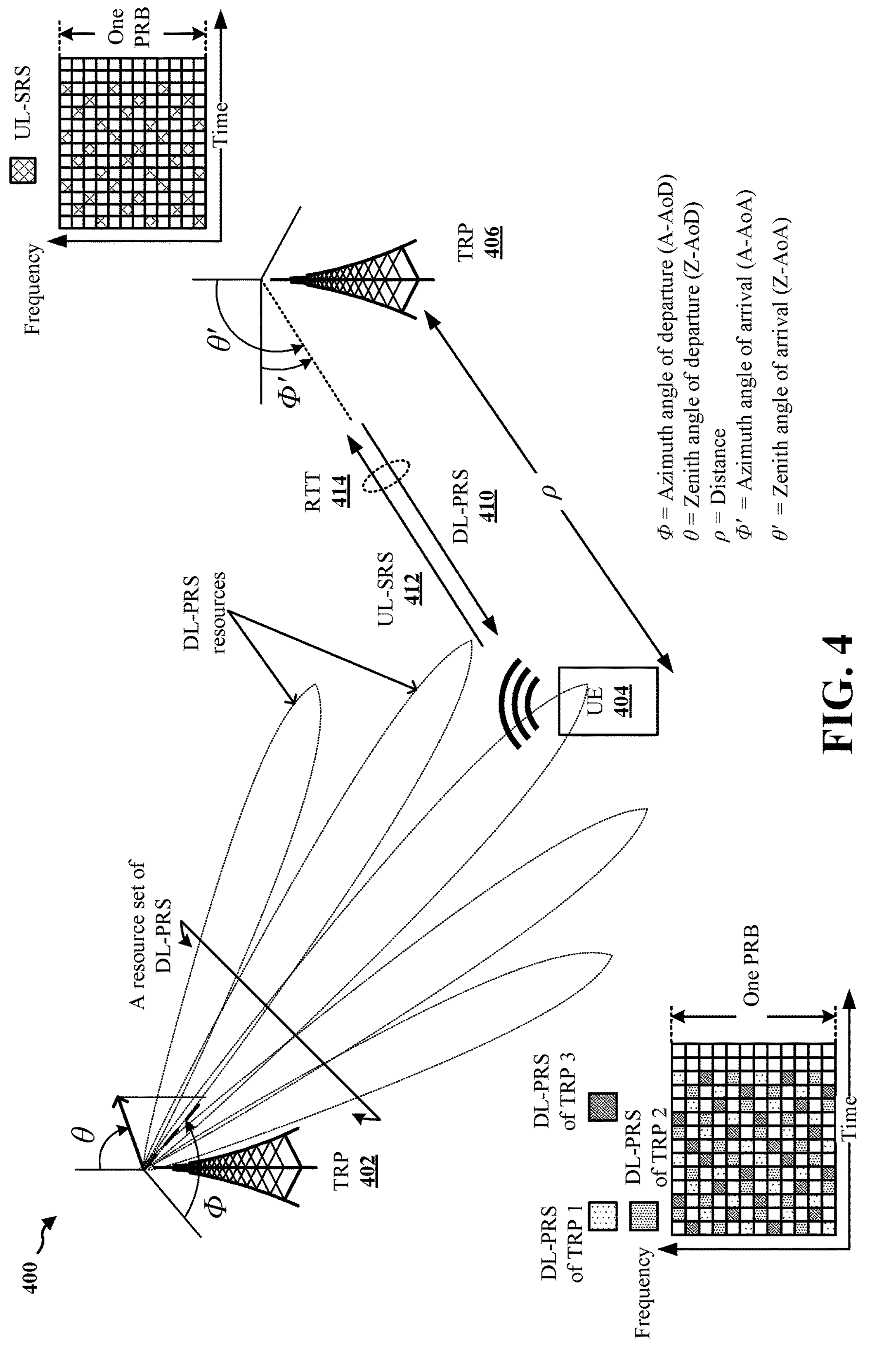
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402,406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402,406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Figure 5:
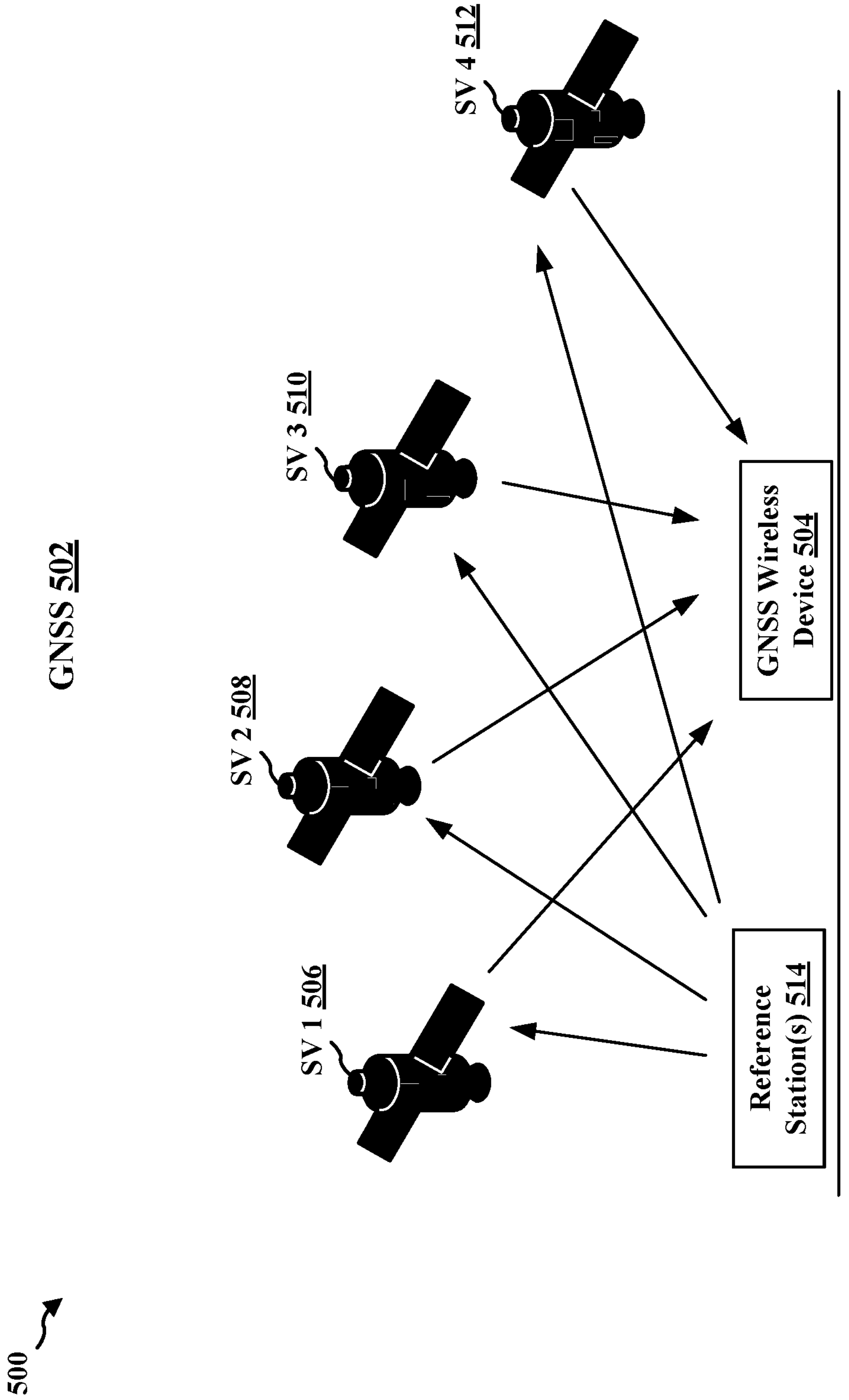
FIG. 5 is a diagram illustrating an example of a global navigation satellite system (GNSS).

FIG. 5 is a diagram 500 illustrating an example of a global navigation satellite system (GNSS) 502. A GNSS may refer to a system that uses satellites (i.e., space vehicles (SVs)) to provide positioning, navigation, and timing (PNT) services to GNSS wireless devices on a global basis (e.g., on a continuous global basis) or regional basis (e.g., on a continuous regional basis). The GNSS 502 may include a GNSS wireless device 504, a first space vehicle (SV) 506, a second SV 508, a third SV 510, a fourth SV 512, and reference station(s) 514. The first SV 506, the second SV 508, the third SV 510, and the fourth SV 512 may be collectively referred to as "the SVs 506-512." An SV may refer to an object placed into orbit around a celestial body (e.g., the Earth) in order to provide PNT services. An SV may also be referred to as a satellite. Although the GNSS 502 is illustrated as including four SVs, the GNSS 502 may include a different number of SVs (e.g., less than four SVs or greater than four SVs). The GNSS wireless device 504 may be or include a UE. A GNSS wireless device may refer to a device that is capable of receiving, measuring, and/or rebroadcasting signals transmitted by SVs for PNT purposes.

The SVs 506-512 may orbit the Earth in different orbits. In an example, the SVs 506-512 may orbit the Earth at a range of 20,000-37,000 km. The SVs may transmit unique signals (e.g., with timestamps) and orbital parameters that may be received and/or measured by the GNSS wireless device 504. The GNSS wireless device 504 may compute positions of the SVs 506-512 based on the unique signals and the orbital parameters. For instance, the GNSS wireless device 504 may measure a distance between the first SV 506 and the GNSS wireless device 504 based upon an amount of time a signal transmitted by the first SV 506 takes to reach the GNSS wireless device 504. The GNSS wireless device 504 may perform a similar procedure for other SVs in the SVs 506-512. The GNSS wireless device 504 may then determine a position of the GNSS wireless device 504 based on the measured distances and other information about the SVs 506-512.

Measurements performed by the GNSS wireless device 504 may be subject to various forms of errors. The reference station(s) 514 may be a station where a GNSS receiver is installed at a known location. The reference station(s) may be at location(s) (e.g., fixed locations) that are pre-surveyed by GNSS observations or other methods for multiple days. Based upon the pre-survey, the reference station(s) 514 may generate error correction data which may be provided to the GNSS wireless device 504 (e.g., via a radio link or via internet services). The GNSS wireless device 504 may use the error data to correct GNSS measurements, which may enable the GNSS wireless device 504 to perform more accurate positioning. The reference station(s) 514 may also be referred to as base station(s).

Figure 6:
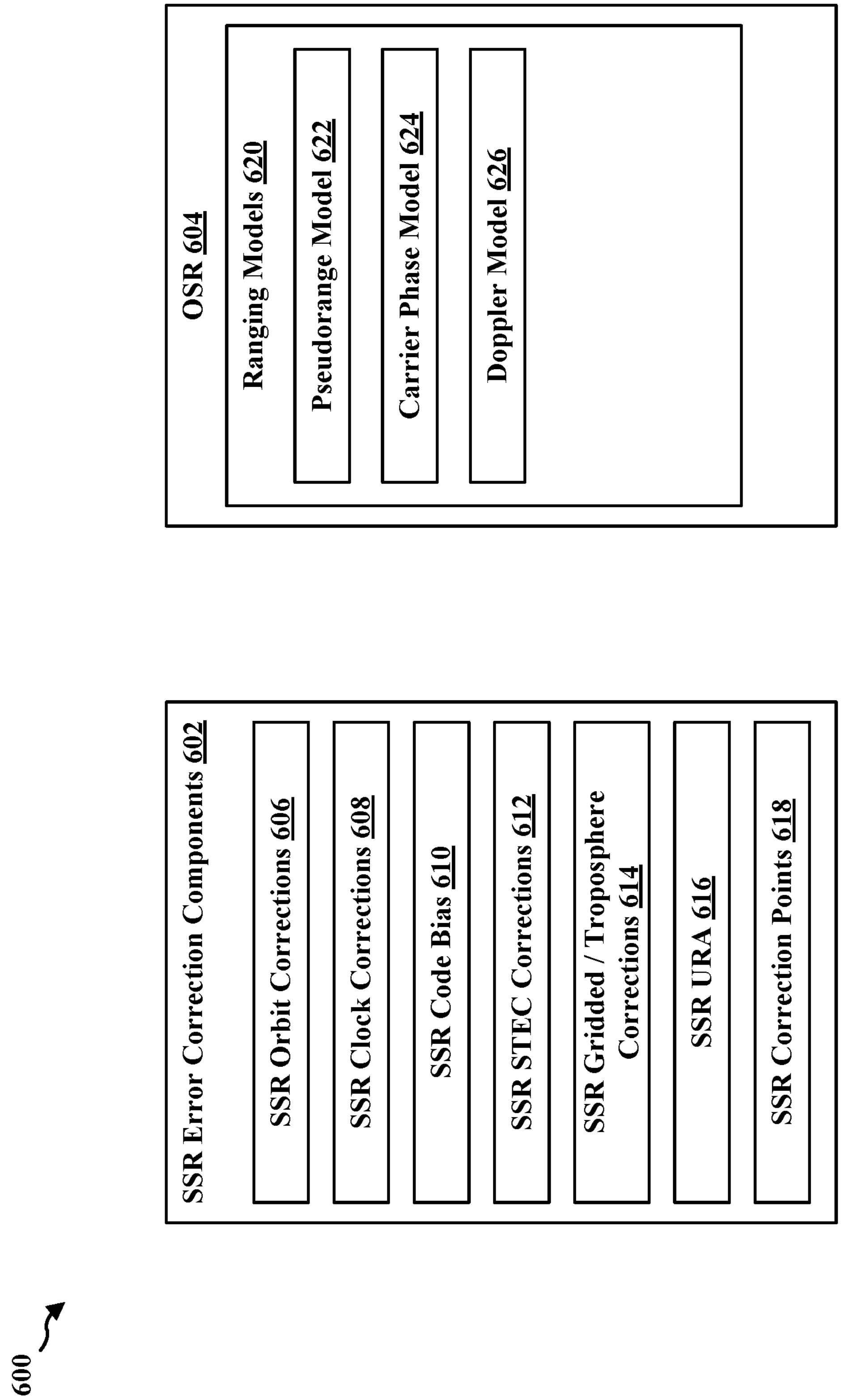
FIG. 6 is a diagram illustrating an example of state-space representation (SSR) error correction components and an observation-space representation (OSR) of GNSS measurements.

FIG. 6 is a diagram 600 illustrating an example of state-space representation (SSR) error correction components and an observation-space representation (OSR) of GNSS measurements. As noted above, GNSS measurements may be subject to different forms of error. A reference station may compute error correction data which may be used by a GNSS wireless device to correct the errors so that the GNSS wireless device may perform more accurate positioning. The error correction data may take different forms. For instance, the error correction data may be state-space representation (SSR) error correction components 602 or the error correction data may be an observation-space representation (OSR) 604. In an example, the SSR error correction components 602 or the OSR 604 may be provided for each SV in the SVs 506-512. The SSR error correction components 602 may be a representation of GNSS measurement error in which error components are represented as parameters of state vectors. The SSR error correction components 602 may include SSR orbit corrections 606, SSR clock corrections 608, an SSR code bias 610, SSR slant total electron content (STEC) corrections 612, SSR gridded/troposphere corrections 614, SSR user range accuracy (URA) 616, and SSR correction points 618. In an example, each SV in the SVs 506-512 may have a different instance of SSR error correction components. Table 2 below provides details about the SSR error correction components 602.

TABLE 2

SSR Error Correction Components

| ID | SSR Error Correction Component | Description |
|---|---|---|
| 1 | SSR Orbit Corrections | Satellite Orbit Corrections in Radial, along-track, and cross-track components |
| 2 | SSR Clock Corrections | Satellite Clock Correction |
| 3 | SSR Code Bias | Code Bias$(\delta b^S_{Pr})$ for Pseudorange Measurements |
| 4 | SSR Phase Bias | Phase Bias$(\delta b^S_{Cp})$ for Carrier Phase Measurements |
| 5 | SSR (Slant Total Electron Content) STEC Corrections | Slant Total Electron Content Delay |
| 6 | SSR Gridded/Troposphere Correction | STEC Residuals and Troposphere Delays at a Series of Correction Points |
| 7 | SSR User Range Accuracy (URA) | Estimated Accuracy of SSR Corrections for Each Satellite which is used to quantify 1-sigma uncertainty of a complete set of SSR |
| 8 | SSR Correction Points | An Array of Correction Points for which Valid SSR Gridded Corrections |

The OSR 604 may represent a GNSS measurement error as a lump sum of error components in an observation space. The OSR 604 may be associated with ranging models 620. In an example, the ranging models 620 may include a pseudorange model 622, a carrier phase model 624, and/or a Doppler model 626. The ranging models 620 may also include models associated with a carrier to noise ratio (CN0) from multiple GNSS constellations, signals, and satellites (i.e., SVs). In an example, each SV in the SVs 506-512 may have a different instance of an OSR.

The pseudorange model 622 may measure a pseudorange in meters. Pseudorange ($PR^s$) may refer to a pseudo distance between a SV and a GNSS wireless device (i.e., a receiver of the GNSS wireless device). The pseudorange model 622 may be associated with/correspond to equation (I) below.

$$PR^s = \left|\vec{r}^s - \vec{r}_r\right| + c * dT_b^s(t^s) + I^s + T^s + \delta b^s_{Pr} + dPR^s + \varepsilon_{PR} \quad \text{(I)}$$

In equation (I), PRs may refer to pseudorange, $\vec{r}^{\,s}$ may refer to a position of an SV, $\vec{r}_r$ may refer to a position of a GNSS receiver (e.g., a GNSS receiver of a GNSS wireless device), c may refer to the speed of light, $$dT_b^s(t^s)$$

may refer to a clock bias of the SV, $I^s$ may refer to an ionosphere delay, $T^s$ may refer to a troposphere delay, $$\delta b^s_{Pr}$$

may refer to a pseudorange code bias, $dPR^s$ may refer to higher order pseudorange term(s), and $\varepsilon_{PR}$ may refer to pseudorange noise. In an example, in an OSR of error, a device may be provided with a value of the pseudorange (as opposed to components that make up pseudorange (e.g., satellite vehicle clock bias, ionospheric delay, etc.)).

The carrier phase model 624 may measure a phase of a received SV signal with respect to a carrier phase generated at a GNSS receiver (e.g., a GNSS receiver of a GNSS wireless device) at a reception time. A carrier phase may be measured in meters. The carrier phase model 624 may be associated with/correspond to equation (II) below.

$$CP^s = |\vec{r}^s - \vec{r}_r| + d * T^s_b(t^s) - I^s + T^s + FCB^s + dCP^s + \lambda * N^s + \varepsilon_{CP} \quad \text{(II)}$$

In equation (II), $CP^S$ may refer to a carrier phase, $\vec{r}^s$ may refer to a position of an SV, $\vec{r}_r$ may refer to a position of a GNSS receiver (e.g., a GNSS receiver of a GNSS wireless device), $$d * T^s_b(t^s)$$

may refer to a clock bias of the SV, $I^s$ may refer to an ionosphere delay, $T^s$ may refer to a troposphere delay, $FCB^s$ may refer to a fractional cycle bias or a carrier phase bias, $dCP^s$ may refer to higher order carrier phase term(s), λ may refer to a signal wavelength, $\lambda * N^s$ may refer to an integer ambiguity of the carrier phase, and may $\varepsilon_{CP}$ refer to carrier phase noise. In an example, in an OSR of error, a device may be provided with a value of the carrier phase (as opposed to components that make up carrier phase (e.g., fractional cycle bias, ionospheric delay, etc.)).

The Doppler model 626 may use a Doppler shift of a received carrier frequency to determine a velocity of a moving GNSS receiver (e.g., a GNSS receiver of the GNSS wireless device). A Doppler measurement may be measured in hertz (Hz). The Doppler model 626 may be associated with/correspond to equation (III) below.

$$DPL^s = -\frac{\left\{v^s_r \cdot \frac{r^s_r}{|r^s_r|} + c * dT^s_b(t^s) + dDPL^s\right\}}{\lambda} + \varepsilon_{DPL} \quad \text{(III)}$$

In equation (III), DPLS may refer to a Doppler measurement, $$v^s_r$$

may refer to an SV position vector, c may refer to a speed of light, $$dT^s_b(t^s)$$

may refer to an SV clock bias, $dDPL^s$ may refer to higher order DPL term(s), λ may refer to a signal wavelength, and $\varepsilon_{DPL}$ may refer to Doppler noise. In an example, in an OSR of error, a device may be provided with a value of the Doppler measurement (as opposed to components that make up Doppler measurement (e.g., the SV position vector, the higher order Doppler term(s), etc.)).

As described above, a GNSS wireless device may utilize the SSR error correction components 602 or the OSR 604 in order to correct errors in GNSS measurements performed by the GNSS wireless device. In one example, a GNSS wireless device may utilize the OSR 604 to correct measurements performed as part of precise point positioning (PPP) or real-time kinematic positioning (RTK). PPP may refer to a GNSS positioning method that calculates precise positions using a single GNSS receiver. PPP may perform positioning based on direct observables (i.e., data that a GNSS receiver may measure on its own) and on ephemerides (i.e., precise measurements of orbits of GNSS satellites made by a geodetic community with a global network of ground stations). RTK may refer to a GNSS positioning method that uses a temporarily fixed base receiver in the field and a relatively nearby mobile receiver to perform positioning. In another example, a GNSS wireless device may be configured to utilize the SSR error correction components 602 to correct GNSS measurements.

In certain cases, some of the SSR error correction components 602 may not be available to a GNSS wireless device. For instance, a data service outage or a data traffic outage (e.g., with respect to a reference station, an internet service provider, a radio link, an SV, etc.) may cause some of the SSR error correction components 602 to not be available to the GNSS wireless device. In one example, a data service outage/data traffic outage may cause an SSR error correction component (e.g., the SSR code bias 610) of each of the set of SVs 506-512 to be unavailable to the GNSS wireless device 504. In another example, a data service outage/data traffic outage may cause an SSR error correction component (e.g., the SSR code bias 610) of the first SV 506 to be unavailable to the GNSS wireless device 504, where the SSR error correction component of the second SV 508, the third SV 510, and the fourth SV 512 may still be available to the GNSS wireless device 504.

When one or more SSR error correction components are not available to a GNSS wireless device, the GNSS wireless device may wait until a full set of SSR error correction components are available. This approach may be suitable for positioning applications that allow for postprocessing and/or allow for a long convergence time. However, this approach may not be suitable for positioning applications that do not allow for a long convergence time (e.g., a RTK/PPP convergence time/speed). Skipping OSR generation may result in lower OSR availability and may slow down a RTK/PPP convergence time.

A global navigation satellite system (GNSS) may refer to a system that uses satellites (i.e., space vehicles (SVs)) to provide positioning, navigation, and timing (PNT) services to GNSS wireless devices (e.g., user equipments (UEs)) on a global basis (e.g., a continuous global basis) or regional basis (e.g., a continuous regional basis). The SVs may transmit signals that may be received by a GNSS wireless device, the GNSS wireless device may measure the signals, and the GNSS wireless device may compute its position on a celestial body (e.g., the Earth) based on the measured signals and other information. The computed position may be subject to various errors caused by the SVs and/or the Earth's atmosphere. The GNSS wireless device may be provided with error correction data that the GNSS wireless device may use to correct the computed position so as to increase an accuracy of the computed position. Examples of error correction data may include state-space representation (SSR) error correction components and an observation-space representation (OSR). SSR error correction components may represent errors that affect positioning as parameters of state vectors, while the OSR may be a "lump sum" of error components represented in observation space. In some cases, a full set of SSR error correction components may not be available to a GNSS wireless device due to a data service outage or a data traffic outage. The GNSS wireless device may wait until a full set of SSR error correction components are available. This approach may be suitable for positioning applications that allow for postprocessing and/or allow for a long convergence time. However, this approach may not be suitable for positioning applications that do not allow for a long convergence time Various technologies pertaining to missing SSR handling with URA are described herein. With more particularity, in one aspect, a GNSS wireless device may generate OSR with available SSR error correction components and the GNSS wireless device may generate an OSR uncertainty value with a relatively higher inflated user range accuracy (URA) value. In another aspect, a GNSS wireless device may generate OSR with available SSR error correction components and the GNSS wireless device may generate an OSR uncertainty value with a relatively lower inflated URA value. The SSR modelling may be data-free (i.e., empirical/physical modeling) in order to compensate for full uncertainty or the SSR modelling may be data-based (e.g., using an SSR data streaming trend (prediction using polynomial fitting) pre-survey with a precise product).

In an example, a GNSS wireless device obtains a set of SSR error correction components associated with a set of SVs, where the set of SSR error correction components includes a first number of SSR error correction components that is less than a second number of SSR error correction components in a full set of SSR error correction components. The GNSS wireless device generates, based on the set of SSR error correction components, (1) an OSR of GNSS measurements associated with the set of SVs and (2) an OSR uncertainty value for the OSR. The GNSS wireless device computes, based on the OSR of the GNSS measurements and the OSR uncertainty value, a position of the GNSS wireless device. The GNSS wireless device outputs an indication of the position of the GNSS wireless device. Vis-à-vis generating, based on the set of SSR error correction components, (1) the OSR of GNSS measurements associated with the set of SVs and (2) the OSR uncertainty value for the OSR, the GNSS wireless device may be able to ascertain its position in a relatively faster manner compared to a GNSS wireless device that skips OSR generation. For instance, the GNSS wireless device may perform precise point positioning (PPP) and/or real-time kinematic positioning (RTK) in a relatively fast manner using the generated OSR.

In GNSS teal-time kinematic positioning (RTK) or precise point positioning (PPP), a state-space representation (SSR) can go missing, e.g., due to data service or data traffic outages. This may result in skipping observation-space representation (OSR) generation. In one aspect, an OSR is generated with available SSR data and an OSR uncertainty is generated with a higher inflated user range accuracy (URA). Alternatively, the OSR may be generated with available SSR data plus SSR modelling (for missing SSR data). This may produce a lower URA than the prior approach. Alternatively, interpolation/extrapolation may be utilized to generate SSR data.

Figure 7:
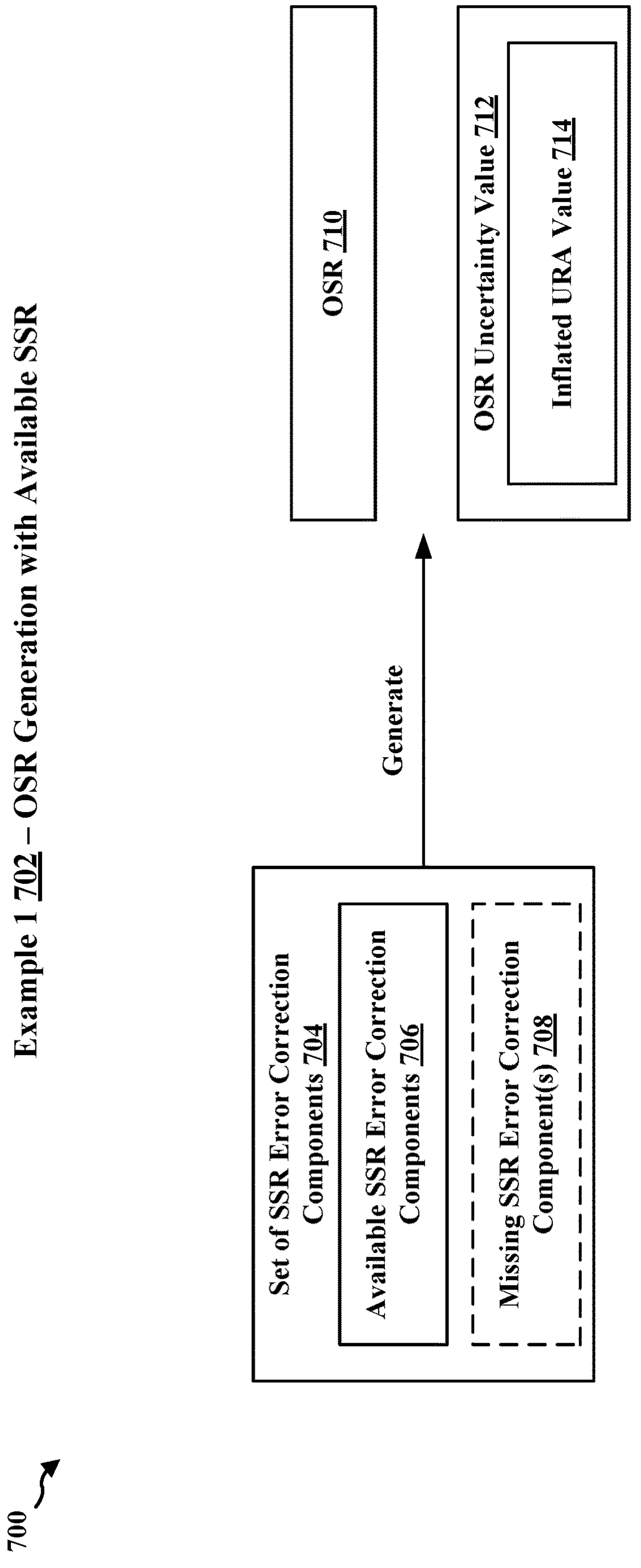
FIG. 7 is a diagram illustrating a first example of OSR generation with available SSR.

FIG. 7 is a diagram 700 illustrating a first example 702 of OSR generation with available SSR. In the first example 702, a GNSS wireless device (e.g., the GNSS wireless device 504) may obtain a set of SSR error correction components 704, where the set of SSR error correction components 704 may include less SSR error correction components than SSR error correction components of a full set of SSR error correction components (e.g., the SSR error correction components 602). In an example, the set of SSR error correction components 704 may include available SSR error correction components 706. In the example, the set of SSR error correction components 704 may be missing some SSR error correction components (i.e., "the missing SSR error correction component(s) 708"). In an example, the available SSR error correction components 706 may include the SSR orbit corrections 606, the SSR clock corrections 608, the STEC corrections 612, the SSR gridded/troposphere corrections 614, the SSR URA 616, and the SSR correction points 618. In the example, the missing SSR error correction component(s) 708 may include the SSR code bias 610.

In the first example 702, the GNSS wireless device may generate an OSR 710 of GNSS measurements based on the available SSR error correction components 706 and the GNSS wireless device may generate an OSR uncertainty value 712 with an inflated URA value 714. In an example, the OSR 710 may be a lump sum corresponding to pseudorange, carrier phase, or Doppler measurements for an SV. With more particularity, in the first example 702, the GNSS wireless device may generate the OSR 710 by not taking into account the missing SSR error correction component(s) 708. In order to generate the OSR uncertainty value 712 with the inflated URA value 714, the GNSS wireless device may look up a corresponding term in a ranging model (e.g., the ranging models 620) based on the missing SSR error correction component(s) 708. The GNSS wireless device may obtain an individual URA value that is based on empirical error. The device may substitute the individual URA value for the missing SSR error correction component(s) 708. Table 3 illustrates SSR types, corresponding terms in ranging models, and individual URA based empirical error.

TABLE 3

SSR Type, Corresponding Ranging Model Terms, and Individual URA

| | SSR Type | Corresponding Term in Ranging Models | Individual URA based Empirical Error |
|---|---|---|---|
| 1 | SSR Orbit Corrections | SV Position | 1-2 m |
| 2 | SSR Clock Corrections | SV Clock Bias | <1 m |
| 3 | SSR Code Bias | Pseudorange/Code Bias | 1 m |
| 4 | SSR Phase Bias | Fractional Cycle Bias or Carrier Phase Bias | <1 cycle (1 wavelength λ) |
| 5 | SSR STEC Corrections | Ionosphere Delay | 1-100 m |
| 6 | SSR Gridded/ Troposphere Corrections | Troposphere Delay | 2-20 m |
| 7 | SSR URA | All of the above | Sum of the above |
| 8 | SSR Correction Points | N/A | N/A |

Equation (IV)-(XI) below correspond to a sample configuration set that may be utilized by the GNSS wireless device in the first example 702. Equations (XII)-(XIV) correspond to different types of OSR uncertainties (e.g., pseudorange uncertainty, carrier phase uncertainty, Doppler measurement uncertainty). The sample configuration set may be based on the individual URA based empirical error in Table 3. For instance, the "2 m" in "OrbitUnc" may be based on the "1-2 m" in Table 3 for "SSR Orbit Corrections." In equations (IV)-(XIV), "pos" may refer to position, "LOS" may refer to line-of-sight, "vel" may refer to velocity, "SV_Rx" may refer to a space vehicle receiver, "Unc" may refer to uncertainty, and "Clk" may refer to clock.

$$\text{Pos\_mapping} = \text{LOS\_vector} * \text{SV\_Rx\_relative\_pos\_vector}; \tag{IV}$$

$$\text{Vel\_mapping} = \text{LOS\_vector} * \text{SV\_Rx\_relative\_vel\_vector}; \tag{V}$$

$$OrbitUnc = \text{Pos\_mapping} * 2\ \text{m}; \tag{VI}$$

$$ClkUnc = \text{Pos\_mapping} * 1\ \text{m}; \tag{VII}$$

$$CodeBiasUnc = \text{Pos\_mapping} * 1\ \text{m}; \tag{VII}$$

$$PhaseBias = \text{Pos\_mapping} * 1 * \text{Wavelength m}; \tag{IX}$$

$$OrbitRateUnc = \text{LOS\_vector} * \left(\frac{4}{3900}\right)\ \text{m/s}; \tag{X}$$

$$CodeBiasRateUnc = \text{LOS\_vector} * \left(\frac{2}{3900}\right)\ \text{m/s}; \tag{XI}$$

$$\text{PR\_Unc} = ScalingFactor * (OrbitUnc + ClkUnc + CodeBiasUnc + IonoModelDelay + TropoModelDelay); \tag{XII}$$

$$\text{CP\_Unc} = \frac{(\text{PR\_Uncertainty} + ScalingFactor * PhaseBiasUnc)}{\text{Wavelength}}; \tag{XIII}$$

$$\text{Doppler}_{Unc} = ScalingFactor * \frac{(OrbitRateUnc + CodeBiasRateUnc)}{\text{Wavelength}}; \tag{XIV}$$

In an example, the missing SSR error correction component(s) 708 may include an SSR code bias. The GNSS wireless device may compute a configuration set according to equations (IV)-(XI) above. For instance, the GNSS wireless device may compute a LOS vector (LOS_vector) between the GNSS wireless device and a space vehicle and the GNSS wireless device may compute a space vehicle receiver relative position vector (SV_Rx_relative_vel_vector) for the SV. The GNSS wireless device may ascertain the term "Pr/code bias" from Table 3. The GNSS wireless device may generate the OSR uncertainty for pseudorange by replacing "OrbitUnc," "ClkUnc," "IonoModelDelay," and "TropoModelDelay" in equation (XII) with the available SSR error correction components 706. The GNSS wireless device may replace the "CodeBiasUnc" term with a value computed according to equation (VII) above. The GNSS wireless device may then obtain the pseudorange uncertainty according to equation (XII).

Figure 8:
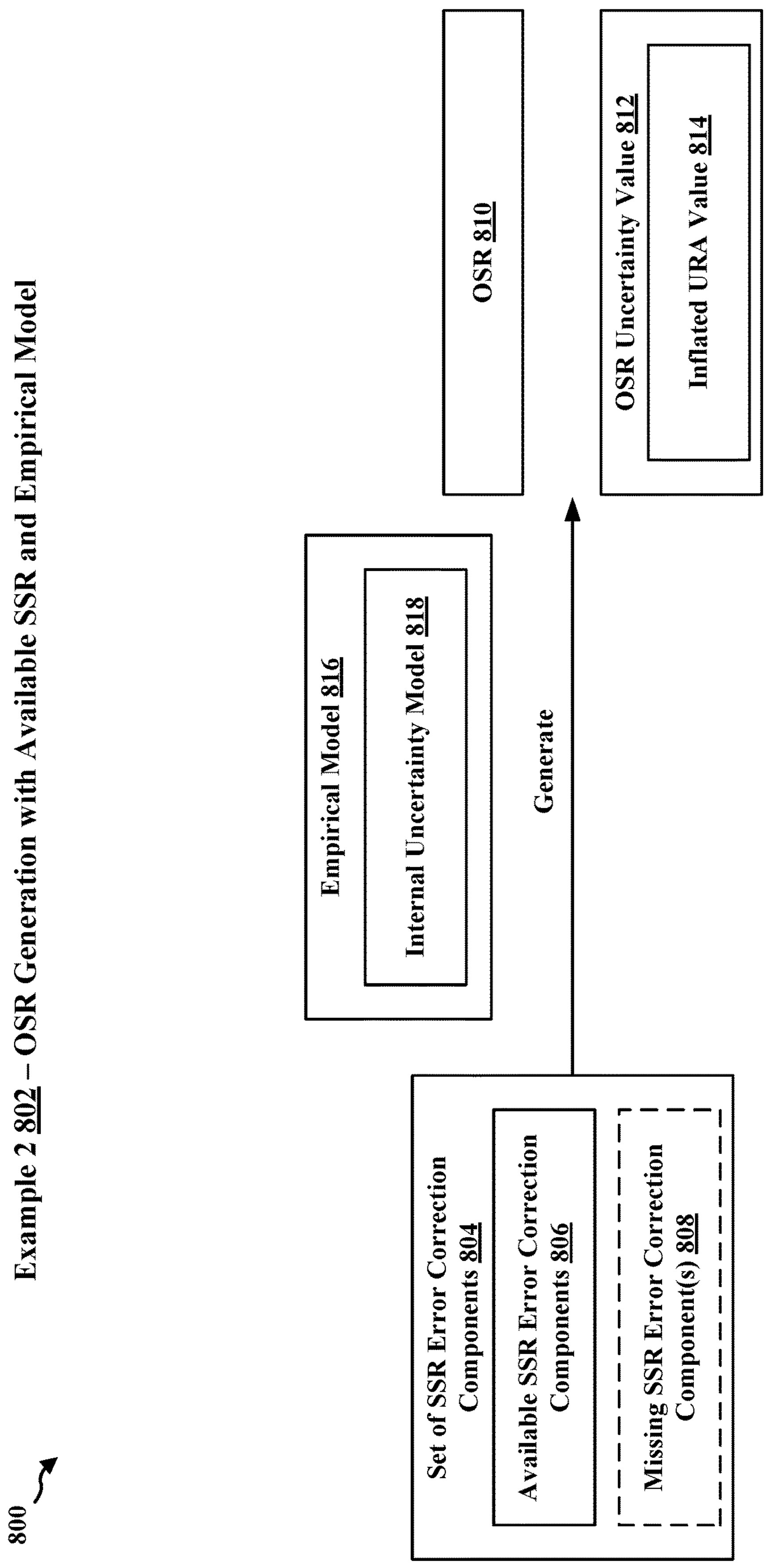
FIG. 8 is a diagram illustrating a second example of OSR generation with available SSR and an empirical model.

FIG. 8 is a diagram 800 illustrating a second example 802 of OSR generation with available SSR and an empirical model 816. In the second example 802, a GNSS wireless device (e.g., the GNSS wireless device 504) may obtain a set of SSR error correction components 804, where the set of SSR error correction components 804 may include less SSR error correction components than SSR error correction components of a full set of SSR error correction components (e.g., the SSR error correction components 602). In an example, the set of SSR error correction components 804 may include available SSR error correction components 806. In the example, the set of SSR error correction components 804 may be missing some SSR error correction components (i.e., "the missing SSR error correction component(s) 808"). In an example, the available SSR error correction components 806 may include the SSR orbit corrections 606, the SSR clock corrections 608, the STEC corrections 612, the SSR gridded/troposphere corrections 614, the SSR URA 616, and the SSR correction points 618. In the example, the missing SSR error correction component(s) 808 may include the SSR code bias 610.

In the second example 802, the GNSS wireless device may generate an OSR 810 of GNSS measurements based on (1) the available SSR error correction components 806 and (2) the empirical model 816 and the GNSS wireless device may generate an OSR uncertainty value 812 with an inflated URA value 814. The empirical model 816 may account for the missing SSR error correction component(s) 808 (e.g., the SSR code bias 610). In an example, the empirical model 816 may be or include a total group delay (TGD) model and an inter-signal bias (ISC) model from broadcast ephemeris, an ionospheric delay model, or a tropospheric delay model. A TGD model may be a model that is associated with azimuth and elevation dependent code delays. The ISC model may be a model that is associated with an inter-signal bias. The ionospheric delay model may be a model that accounts for delays caused by the ionosphere of the Earth. The tropospheric delay model may be a model that accounts for delays caused by the troposphere of the Earth. In an example, the inflated URA value 814 may be lower than the inflated URA value 714. Table 4 below lists types of SSR error correction components and corresponding empirical models that may be used as substitutes for the types of SSR error correction components.

TABLE 4

SSR Type and Corresponding Substitute Empirical Model

| | SSR Type | Corresponding Empirical Model for Substitute |
|---|---|---|
| 1 | SSR Orbit Corrections | N/A |
| 2 | SSR Clock Corrections | N/A |
| 3 | SSR Code Bias | Total Group Delay (TGD) Model + Inter-signal bias (ISC) Model from Broadcast Ephemeris |
| 4 | SSR Phase Bias | N/A |
| 5 | SSR STEC Corrections | Ionospheric Delay Model |
| 6 | SSR Gridded/Troposphere Corrections | Tropospheric Delay Model |
| 7 | SSR URA | N/A |
| 8 | SSR Correction Points | N/A |

In order to generate the inflated URA value 814, the GNSS wireless device may utilize past SSR error correction components corresponding to a time before a data service outage/data traffic outage occurred which resulted in the missing SSR error correction component(s) 808. Equations (XV) and (XVI) below reflect such a process.

$$\Delta SSR(t_0) = SSR_{data}(t_0) - SSR_{model}(t_0) \tag{XV}$$

$$URS_{inflated}(t_1) = URA_{data}(t_1) + \Delta SSR(t_0) \tag{XVI}$$

In equation (XV), $t_0$ may refer to a time at which an SSR error correction component was available (e.g., a time prior to a data service outage/data traffic outage), $SSR_{data}(t_0)$ may refer to a value of an SSR error correction component (e.g., an SSR code bias) at $t_0$, $SSR_{model}(t_0)$ may refer to a value of the SSR correction component generated by an empirical model at $t_0$ (e.g., an SSR code bias generated by a TGD model and an ISC model at $t_0$), and $\Delta SSR(t_0)$ may refer to a difference between $SSR_{data}(t_0)$ and $SSR_{model}(t_0)$. The GNSS wireless device may generate the inflated URA value 814 ($URS_{inflated}(t_1)$) at a time $t_1$ corresponding to the data service outage/data traffic outage according to equation (XVI). In equation (XVI), $URA_{data}(t_1)$ may refer to a SSR URA for time $t_1$.

In one aspect, (valid) past SSR error correction components may not be available to the GNSS wireless device. In such an aspect, the GNSS wireless device may utilize an internal uncertainty model 818 of the empirical model 816 in order to generate the OSR uncertainty value 812 with the inflated URA value 814. The internal uncertainty model 818 may refer to an uncertainty model incorporated into the empirical model 816 itself. In an example, the GNSS wireless device may utilize an ionospheric delay model, which may account for 50% of ionospheric delay error on average (i.e., 0.5-50 m).

Figure 9:
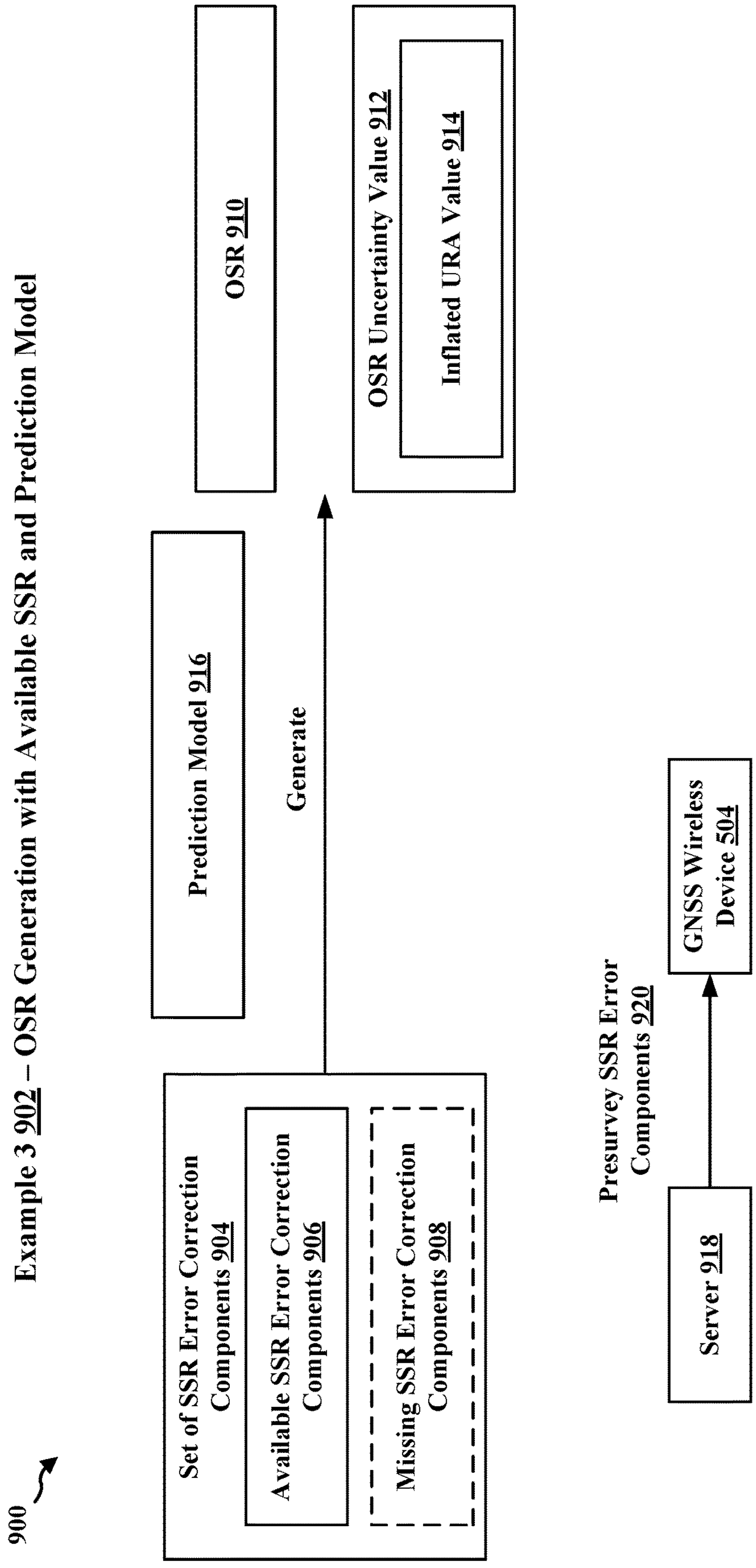
FIG. 9 is a diagram illustrating a third example of OSR generation with available SSR and a prediction model.

FIG. 9 is a diagram 900 illustrating a third example 902 of OSR generation with available SSR and a prediction model 916. In the third example 902, a GNSS wireless device (e.g., the GNSS wireless device 504) may obtain a set of SSR error correction components 904, where the set of SSR error correction components 904 may include less SSR error correction components than SSR error correction components of a full set of SSR error correction components (e.g., the SSR error correction components 602). In an example, the set of SSR error correction components 904 may include available SSR error correction components 906. In the example, the set of SSR error correction components 904 may be missing some SSR error correction components (i.e., "the missing SSR error correction component(s) 908"). In an example, the available SSR error correction components 906 may include the SSR orbit corrections 606, the SSR clock corrections 608, the STEC corrections 612, the SSR gridded/troposphere corrections 614, the SSR URA 616, and the SSR correction points 618. In the example, the missing SSR error correction component(s) 908 may include the SSR code bias 610.

In the third example 902, the GNSS wireless device may generate an OSR 910 of GNSS measurements based on (1) the available SSR error correction components 906 and (2) the prediction model 916 and the GNSS wireless device may generate an OSR uncertainty value 912 with an inflated URA value 914. With more particularity, the GNSS wireless device may generate the OSR 910 based on (1) the available SSR error correction components 906 and (2) the prediction model for the missing SSR error correction component(s) 908. The inflated URA value 914 may be less than the inflated URA value 714.

Figure 10:
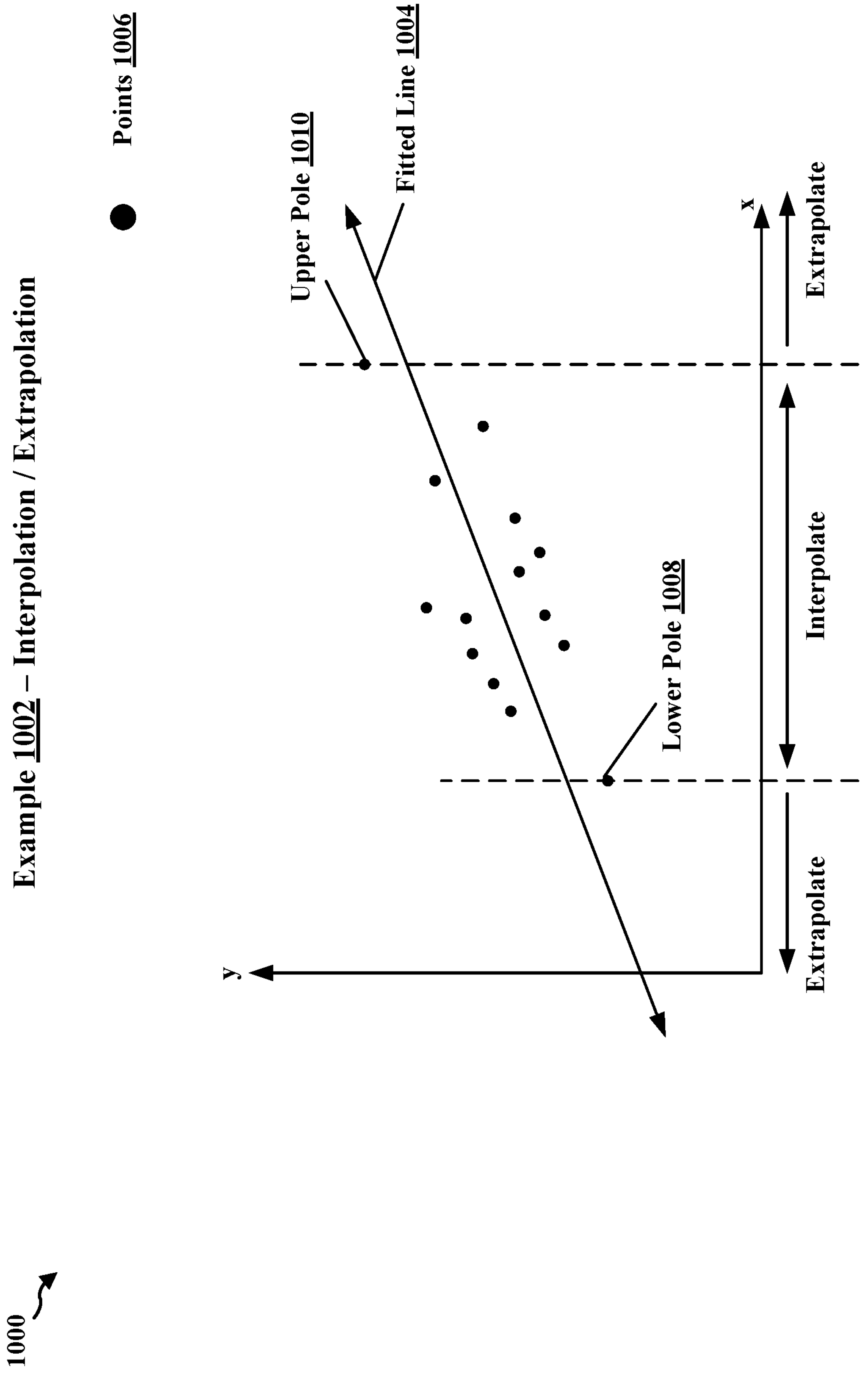
FIG. 10 is a diagram illustrating an example of interpolation and extrapolation associated with a prediction model.

FIG. 10 is a diagram 1000 illustrating an example 1002 of interpolation and extrapolation associated with a prediction model. The example 1002 may correspond to the third example 902. In the third example 902, the GNSS wireless device may predict missing SSR error correction components based on past SSR error correction components. The interpolation and the extrapolation may be performed using a data streaming trend (e.g., polynomial fitting). Equation (XVII) below is an equation that may be used for polynomial fitting.

$$y = \sum_{i=0}^{n} c_i x^i \qquad \text{(XVII)}$$

In equation (XVII), n may refer to an order of a polynomial. A fourth order polynomial may provide for an interpolated satellite position error of less than 1 mm within a 300 second validity duration.

In the third example 902, and as illustrated in the example 1002, the GNSS wireless device may fit a line (a fitted line 1004) to points 1006, where the points 1006 may correspond to values of past SSR error correction components. The points 1006 may include a lower pole 1008 (i.e., a point with a lowest value) and an upper pole 1010 (i.e., a point with a highest value). A GNSS may execute a prediction model in order to interpolate between the points 1006 and/or extrapolate outside of the points 1006.

Referring back to FIG. 9, in the third example 902, the GNSS wireless device may generate the OSR uncertainty value 912 with the inflated URA value 914 using a presurvey with precise products in a server assisted mode. For instance, a server 918 may transmit/broadcast (e.g., at a fixed cadence) a presurvey SSR error components 920 to the GNSS wireless device 504, and the GNSS wireless device 504 may generate the OSR uncertainty value 912 with the inflated URA value 914 based on the presurvey SSR error components 920.

The GNSS wireless device 504 may generate the OSR uncertainty value 912 with the inflated URA value 914 according to equations (XVIII)-(XXI) below.

$$\Delta SSR_i(t_0) = SSR_{data}(t_0) - SSR_{Precise}(t_0) \qquad \text{(XVIII)}$$

$$\Delta SSR_i(t_1) = SSR_{data}(t_1) - SSR_{Precise}(t_1) \qquad \text{(XIX)}$$

$$\cdots$$

$$\Delta SSR_i(t_n) = SSR_{data}(t_n) - SSR_{Precise}(t_n) \qquad \text{(XX)}$$

$$URA_{inflated}(t_{n+1}) = \overline{\Delta SSR_1} + \overline{\Delta SSR_2} + \ldots + \overline{\Delta SSR_6} \qquad \text{(XXI)}$$

In equations (XVIII)-(XXI), $t_0$, $t_1$, and $t_n$ may correspond to a time before a data service outage/data traffic outage occurred (i.e., a history data buffer accumulated from $t_0$ to $t_1$) and $t_{n+1}$ may correspond to a time at which the data service outage/data traffic outage occurred. In equations (XVIII)-(XX), i may refer to a type of SSR error correction component (e.g., SSR orbit corrections, SSR clock corrections, etc.). $SSR_{Precise}$ may correspond to an SSR error correction component of the presurvey SSR error components 920. $URA_{inflated}(t_{n+1})$ may be the inflated URA value 914.

Figure 11:
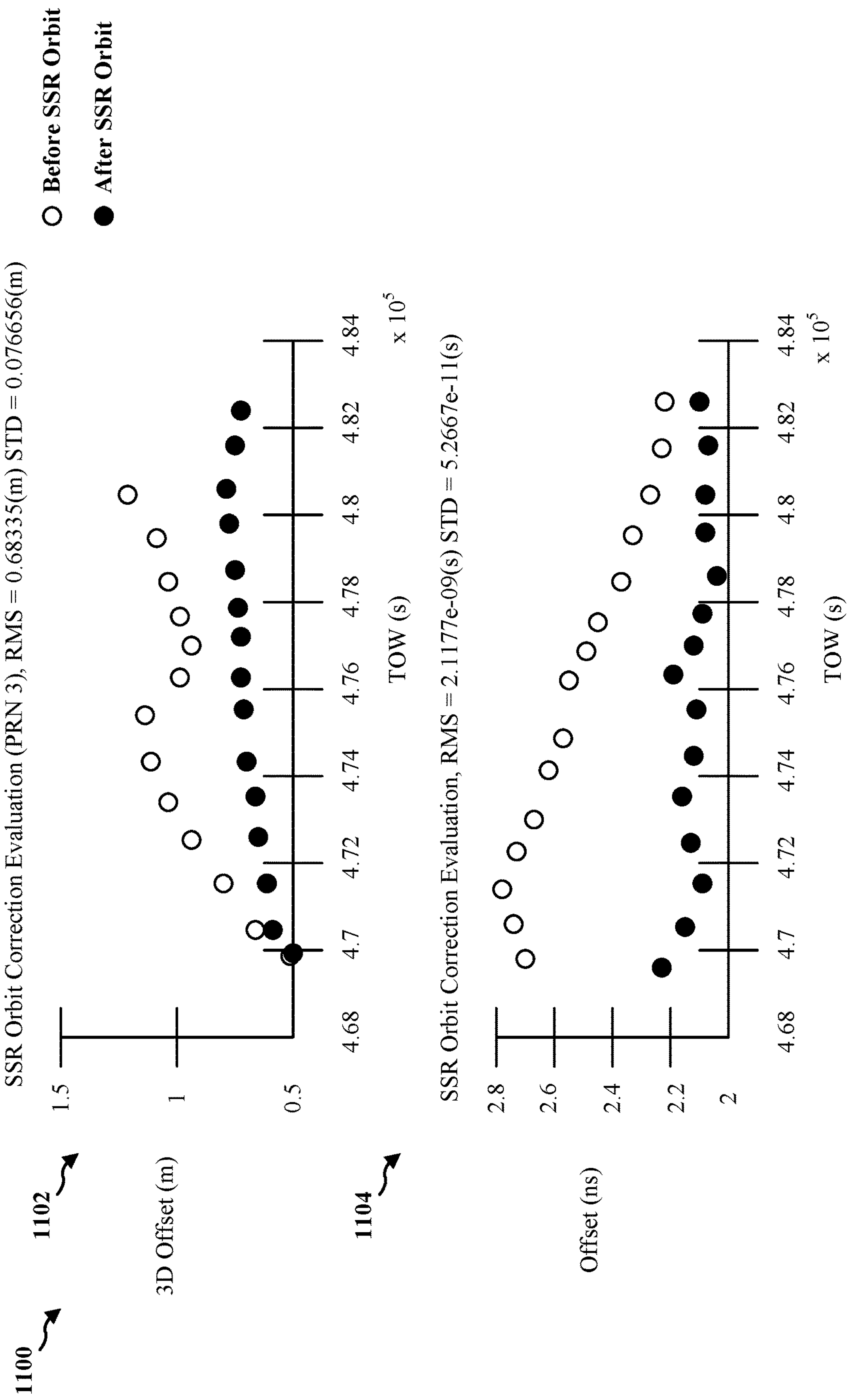
FIG. 11 is a diagram illustrating example aspects of SSR orbit correction evaluation.

FIG. 11 is a diagram 1100 illustrating example aspects of SSR orbit correction evaluation. The diagram 1100 may be associated with the third example 902. The diagram 1100 includes a first plot 1102 that plots a three-dimensional (3D) offset (in m) versus a time of the week (TOW) for pseudo-random number 3 (PRN 3). The diagram 1100 also includes a second plot 1104 that plots an offset (in nanoseconds) versus a TOW. As illustrated in the first plot 1102 and the second plot 1104, an offset against an international GNSS service (IGS) precise product may indicate that a residual error after applying SSR error correction components is at a level of 0.5-1 m (orbit) and 2-2.2 ns (clock).

Figure 12:
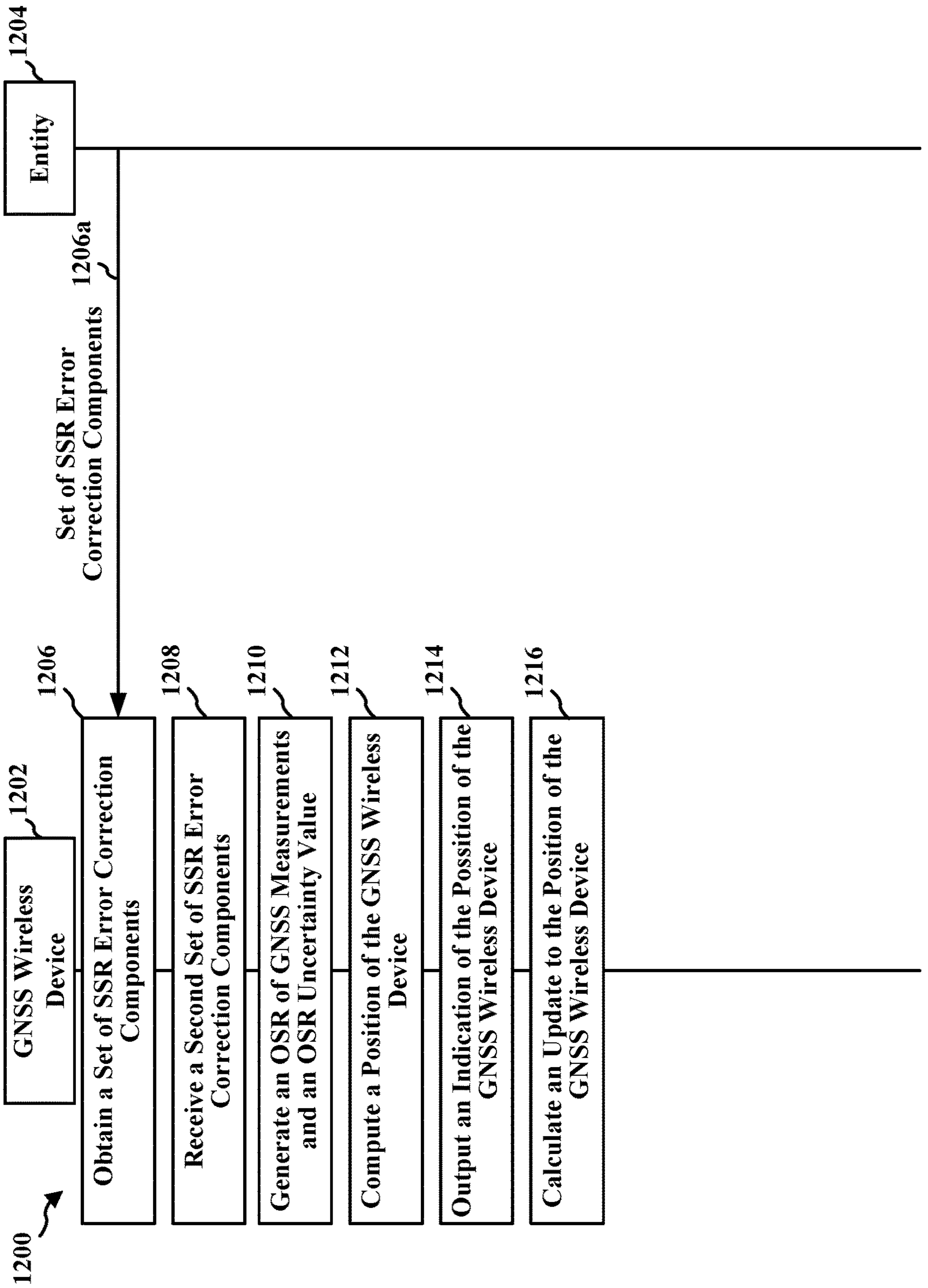
FIG. 12 is a communication flow diagram between a GNSS wireless device and an entity.

FIG. 12 is a communication flow diagram 1200 between a GNSS wireless device 1202 and an entity 1204. In an example, the GNSS wireless device 1202 may be the UE 104, the UE 350, the UE 404, the GNSS wireless device 504, or the apparatus 1504. In an example, the entity 1204 may be the base station 102, the base station 310, the TRP 402, the TRP 406, one or more of the SVs 506-412, the reference station(s) 514, a network node, an internet service provider, etc.

At 1206, the GNSS wireless device 1202 may obtain a set of SSR error correction components associated with a set of SVs, where the set of SSR error correction components includes a first number of SSR error correction components that is less than a second number of SSR error correction components in a full set of SSR error correction components. For instance, at 1206*a*, the GNSS wireless device 1202 may receive the set of SSR error correction from the entity 1204, where the set of SSR error correction components may be transmitted/broadcast by the entity 1204 to/for the GNSS wireless device 1202. Prior to, concurrently with, or subsequent to obtaining the set of SSR error correction components, the GNSS wireless device 1202 may perform GNSS measurements on signal(s) transmitted by the set of SVs. At 1210, the GNSS wireless device 1202 may generate, based on the set of SSR error correction components, (1) an OSR of the GNSS measurements associated with the set of SVs and (2) an OSR uncertainty value for the OSR. At 1212, the GNSS wireless device 1202 may compute, based on the OSR of the GNSS measurements and the OSR uncertainty value, a position of the GNSS wireless device. For instance, the GNSS wireless device 1202 may correct the GNSS measurements with the OSR and compute the position of the GNSS wireless device based on the corrected GNSS measurements. At 1214, the GNSS wireless device 1202 may output an indication of the position of the GNSS wireless device. At 1216, the GNSS wireless device 1202 may calculate an update to the position of the GNSS wireless device. For instance, the GNSS wireless device 1202 may calculate an update to the position of the GNSS wireless device 1202 using the OSR.

In one aspect, at 1208, the GNSS wireless device 1202 may receive, from a server, a second set of SSR error correction components associated with a presurvey corresponding to a server-assisted mode, where generating the OSR uncertainty value with the URA value at 1210 may include generating the URA value based on the second set of SSR error correction components.

Figure 13:
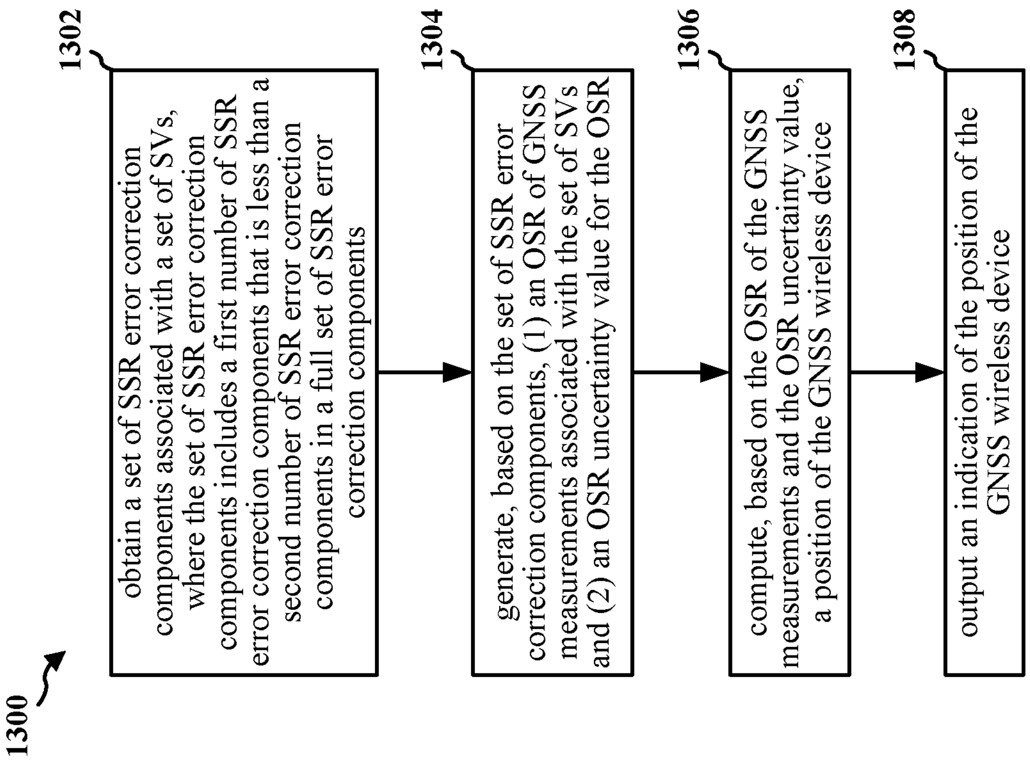
FIG. 13 is a flowchart of a method of wireless communication.

FIG. 13 is a flowchart 1300 of a method of wireless communication. The method may be performed by a GNSS wireless device (e.g., the GNSS wireless device 504, the GNSS wireless device 1202), a UE (e.g., the UE 104, the UE 404, the UE 350, the apparatus 1504), etc. The method may be associated with various advantages at the GNSS wireless device or the UE, such as enabling more accurate position determination at the GNSS wireless device or the UE. In an example, the method may be performed by the missing SSR component 198.

At 1302, the GNSS wireless device obtains a set of SSR error correction components associated with a set of SVs, where the set of SSR error correction components includes a first number of SSR error correction components that is less than a second number of SSR error correction components in a full set of SSR error correction components. For example, FIG. 12 at 1206 shows that the GNSS wireless device 1202 may obtain a set of SSR error correction components associated with a set of SVs, where the set of SSR error correction components includes a first number of SSR error correction components that is less than a second number of SSR error correction components in a full set of SSR error correction components. In an example, the set of SSR error correction components may be the set of SSR error correction components 704, the set of SSR error correction components 804, or the set of SSR error correction components 904. In an example, the full of set of SSR error correction components may be the SSR error correction components 602. In an example, the first number of SSR correction components may correspond to the available SSR error correction components 706, the available SSR error correction components 806, or the available SSR error correction components 906. In an example, the set of SVs may be or include the SVs 506-512. In an example, 1302 may be performed by the missing SSR component 198.

At 1304, the GNSS wireless device generates, based on the set of SSR error correction components, (1) an OSR of GNSS measurements associated with the set of SVs and (2) an OSR uncertainty value for the OSR. For example, FIG. 12 at 1210 shows that the GNSS wireless device 1202 may generate, based on the set of SSR error correction components, (1) an OSR of GNSS measurements associated with the set of SVs and (2) an OSR uncertainty value for the OSR. In an example, the OSR of the GNSS measurements may be or include the OSR 604. In an example, generating the OSR of the GNSS measurements associated with the set of SVs and the OSR uncertainty value for the OSR may correspond to the first example 702, the second example 802, or the third example 902. For instance, the OSR may be the OSR 710, the OSR 810, or the OSR 910 and the OSR uncertainty value may be the OSR uncertainty value 712, the OSR uncertainty value 812, or the OSR uncertainty value 912. In an example, 1304 may be performed by the missing SSR component 198.

At 1306, the GNSS wireless device computes, based on the OSR of the GNSS measurements and the OSR uncertainty value, a position of the GNSS wireless device. For example, FIG. 12 at 1212 shows that the GNSS wireless device 1202 may compute, based on the OSR of the GNSS measurements and the OSR uncertainty value, a position of the GNSS wireless device. In an example, 1306 may be performed by the missing SSR component 198.

At 1308, the GNSS wireless device outputs an indication of the position of the GNSS wireless device. For example, FIG. 12 at 1214 shows that the GNSS wireless device 1202 may output an indication of the position of the GNSS wireless device. In an example, 1308 may be performed by the missing SSR component 198.

Figure 14:
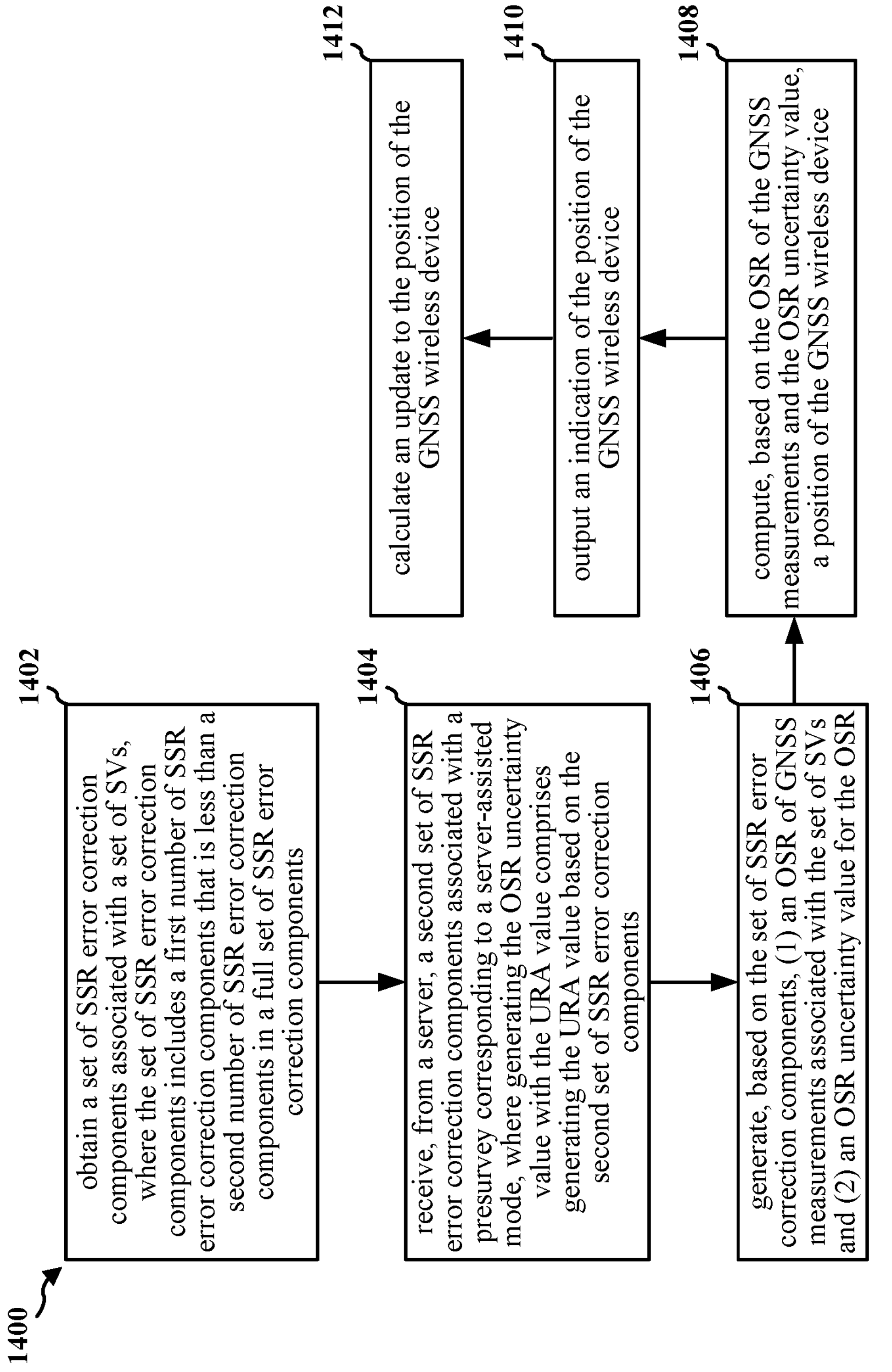
FIG. 14 is a flowchart of a method of wireless communication.

FIG. 14 is a flowchart 1400 of a method of wireless communication. The method may be performed by a GNSS wireless device (e.g., the GNSS wireless device 504, the GNSS wireless device 1202), a UE (e.g., the UE 104, the UE 404, the UE 350, the apparatus 1504), etc. The method may be associated with various advantages at the GNSS wireless device or the UE, such as enabling more accurate position determination at the GNSS wireless device or the UE. In an example, the method (including the various aspects detailed below) may be performed by the missing SSR component 198.

At 1402, the GNSS wireless device obtains a set of SSR error correction components associated with a set of SVs, where the set of SSR error correction components includes a first number of SSR error correction components that is less than a second number of SSR error correction components in a full set of SSR error correction components. For example, FIG. 1206 shows that the GNSS wireless device 1202 may obtain a set of SSR error correction components associated with a set of SVs, where the set of SSR error correction components includes a first number of SSR error correction components that is less than a second number of SSR error correction components in a full set of SSR error correction components. In an example, the set of SSR error correction components may be the set of SSR error correction components 704, the set of SSR error correction components 804, or the set of SSR error correction components 904. In an example, the full of set of SSR error correction components may be the SSR error correction components 602. In an example, the first number of SSR correction components may correspond to the available SSR error correction components 706, the available SSR error correction components 806, or the available SSR error correction components 906. In an example, the set of SVs may be or include the SVs 506-512. In an example, 1402 may be performed by the missing SSR component 198.

At 1406, the GNSS wireless device generates, based on the set of SSR error correction components, (1) an OSR of GNSS measurements associated with the set of SVs and (2) an OSR uncertainty value for the OSR. For example, FIG. 12 at 1210 shows that the GNSS wireless device 1202 may generate, based on the set of SSR error correction components, (1) an OSR of GNSS measurements associated with the set of SVs and (2) an OSR uncertainty value for the OSR. In an example, the OSR of the GNSS measurements may be or include the OSR 604. In an example, generating the OSR of the GNSS measurements associated with the set of SVs and the OSR uncertainty value for the OSR may correspond to the first example 702, the second example 802, or the third example 902. For instance, the OSR may be the OSR 710, the OSR 810, or the OSR 910 and the OSR uncertainty value may be the OSR uncertainty value 712, the OSR uncertainty value 812, or the OSR uncertainty value 912. In an example, 1406 may be performed by the missing SSR component 198.

At 1408, the GNSS wireless device computes, based on the OSR of the GNSS measurements and the OSR uncertainty value, a position of the GNSS wireless device. For example, FIG. 12 at 1212 shows that the GNSS wireless device 1202 may compute, based on the OSR of the GNSS measurements and the OSR uncertainty value, a position of the GNSS wireless device. In an example, 1408 may be performed by the missing SSR component 198.

At 1410, the GNSS wireless device outputs an indication of the position of the GNSS wireless device. For example, FIG. 12 at 1214 shows that the GNSS wireless device 1202 may output an indication of the position of the GNSS wireless device. In an example, 1410 may be performed by the missing SSR component 198.

In one aspect, at 1412, the GNSS wireless device may calculate an update to the position of the GNSS wireless device. For example, FIG. 12 at 1216 shows that the GNSS wireless device 1202 may calculate an update to the position of the GNSS wireless device. In an example, 1412 may be performed by the missing SSR component 198.

In one aspect, calculating the update to the position of the GNSS wireless device may include: calculating a first correction to the position of the GNSS wireless device; or calculating a second correction to the GNSS measurement associated with the position of the GNSS wireless device. For example, calculating the update to the position of the GNSS wireless device at 1216 may include calculating a first correction to the position of the GNSS wireless device; or calculating a second correction to a GNSS measurement associated with the position of the GNSS wireless device.

In one aspect, generating the OSR uncertainty value for the OSR may include: generating the OSR uncertainty value with a URA value. For example, generating the OSR uncertainty value for the OSR at 1210 may include: generating the OSR uncertainty value with a URA value. In an example, the URA value may be the inflated URA value 714, the inflated URA value 814, or the inflated URA value 914.

In one aspect, generating the OSR uncertainty value with the URA value may include generating the URA value based on a ranging model. For example, the ranging model may be or include the ranging models 620. The aforementioned aspect may correspond to the first example 702.

In one aspect, the ranging model may include a pseudorange model, a carrier phase model, or a Doppler model. For example, the pseudorange model may be the pseudorange model 622, the carrier phase model may be the carrier phase model 624, and/or the Doppler model may be the Doppler model 626. In an example, the aforementioned aspect may correspond to equations (I)-(III) above. The pseudorange model may also be referred to as a code phase model.

In one aspect, generating the URA value based on the ranging model may include generating the URA value based on at least one of an SV position value of the ranging model, an SV clock bias value of the ranging model, a code bias value of the ranging model, a fractional cycle bias value of the ranging model, a carrier phase bias value of the ranging model, an ionospheric delay value of the ranging model, or a tropospheric delay value of the ranging model. For example, the aforementioned aspect may correspond to equations (I)-(III) above. The SV position value may be referred to as an SV position value uncertainty. The SV block bias value may be referred to as an SV block bias uncertainty. The code bias value may be referred to as code bias uncertainty. The fractional cycle bias value may be referred to as a fractional cycle bias uncertainty. The carrier phase bias value may be referred to as a carrier phase bias uncertainty. The ionospheric delay value may be referred to as an ionospheric delay uncertainty. The tropospheric delay value may be referred to as a tropospheric delay uncertainty.

In one aspect, generating the OSR may include: generating the OSR based on the set of SSR error correction components and an empirical model. For example, generating the OSR at 1210 may include: generating the OSR based on the set of SSR error correction components and an empirical model. In an example, the aforementioned aspect may correspond to the second example 802. For example, the empirical model may be the empirical model 816.

In one aspect, the empirical model may include at least one of a TGD and inter-signal bias model, an ionospheric delay model, or a tropospheric delay model. For example, the aforementioned aspect may correspond to Table 4 above.

In one aspect, generating the OSR may include generating the OSR further based on a second set of SSR error correction components, where the second set of SSR error correction components may predate the set of SSR error correction components. For example, generating the OSR at 1210 may include generating the OSR further based on a second set of SSR error correction components, where the second set of SSR error correction components may predate the set of SSR error correction components. In an example, the aforementioned aspect may correspond to equations (XV) and (XVI) above.

In one aspect, generating the OSR uncertainty value with the URA value may include generating the URA value based on the set of SSR error correction components, the second set of SSR error correction components, and a second URA value associated with the second set of SSR error correction components. For example, generating the OSR uncertainty value at 1210 with the URA value may include generating the URA value based on the set of SSR error correction components, the second set of SSR error correction components, and a second URA value associated with the second set of SSR error correction components. In an example, the second URA value may correspond to $URA_{data}(t_1)$.

In one aspect, generating the OSR uncertainty value with the URA value may include generating the URA value based on an internal uncertainty model of the empirical model. For example, the internal uncertainty model may be the internal uncertainty model 818.

In one aspect, generating the OSR may include: generating the OSR based on the set of SSR error correction components and a prediction model. For example, generating the OSR at 1210 may include: generating the OSR based on the set of SSR error correction components and a prediction model. The aforementioned aspect may correspond to the third example 902. For instance, the prediction model may be the prediction model 916.

In one aspect, generating the OSR based on the set of SSR error correction components and the prediction model may include performing at least one of an interpolation or an extrapolation based on the set of SSR error correction components and the prediction model. The aforementioned aspect may correspond to the example 1002 in FIG. 10.

In one aspect, at 1404, the GNSS wireless device may receive, from a server, a second set of SSR error correction components associated with a presurvey corresponding to a server-assisted mode, where generating the OSR uncertainty value with the URA value includes generating the URA value based on the second set of SSR error correction components. For example, FIG. 12 at 1208 shows that the GNSS wireless device 1202 may receive, from a server, a second set of SSR error correction components associated with a presurvey corresponding to a server-assisted mode, where generating the OSR uncertainty value with the URA value includes generating the URA value based on the second set of SSR error correction components. In another example, the server may be the server 918 and the second set of SSR error correction components associated with the presurvey corresponding to the server-assisted mode may be the presurvey SSR error components 920. In an example, 1404 may be performed by the missing SSR component 198.

In one aspect, outputting the indication of the computed position of the GNSS wireless device may include at least one of: storing the indication of the computed position of the GNSS wireless device in at least one of a memory, a buffer, or a cache; or transmitting the indication of the computed position of the GNSS wireless device. For example, outputting the indication of the computed position of the GNSS wireless device at 1214 may include at least one of: storing the indication of the computed position of the GNSS wireless device in at least one of a memory, a buffer, or a cache; or transmitting the indication of the computed position of the GNSS wireless device.

In one aspect, the OSR may be associated with a sum of error correction components, and where the set of SSR error correction components may be associated with at least one parameter of at least one state vector. For example, the OSR may correspond to PRS. CPS, or DPLS in equations (I)-(III), respectively and the set of SSR error correction components may correspond to Table 2 above.

In one aspect, generating the OSR of the GNSS measurements may include: defining a VRS coordinate corresponding to the OSR, where generating the OSR of the GNSS measurements may include generating the OSR of the GNSS measurements further based on the VRS coordinate. For example, generating the OSR of the GNSS measurements may include: defining a VRS coordinate corresponding to the OSR, where generating the OSR of the GNSS measurements at 1210 may include generating the OSR of the GNSS measurements further based on the VRS coordinate. In one aspect, the OSR of the GNSS measurements may be associated with at least one of a physical GNSS wireless device or a virtual GNSS wireless device. For example, the OSR generated at 1210 may be associated with at least one of a physical GNSS wireless device or a virtual GNSS wireless device.

Figure 15:
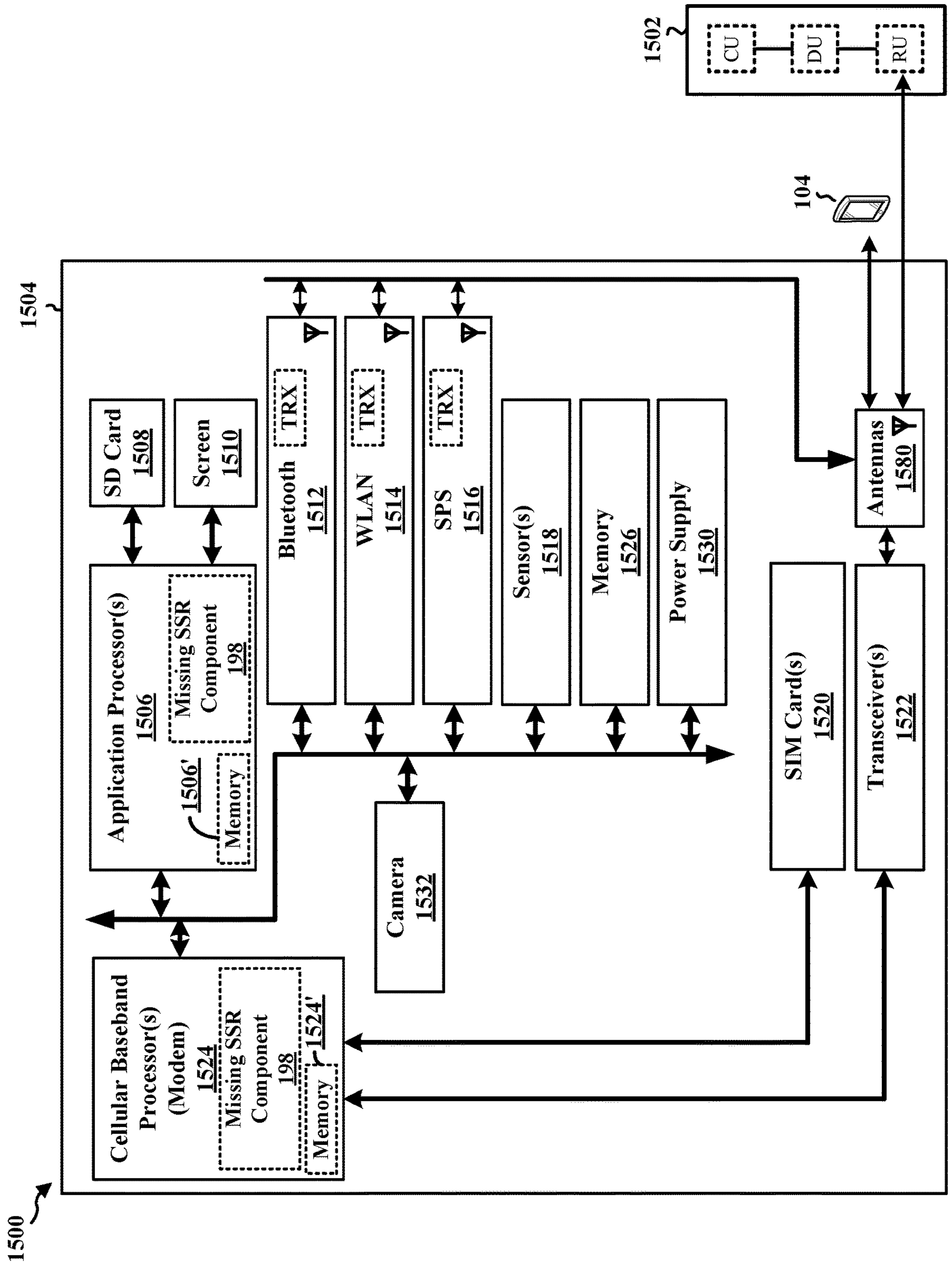
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include at least one cellular baseband processor 1524 (also referred to as a modem) coupled to one or more transceivers 1522 (e.g., cellular RF transceiver). The cellular baseband processor(s) 1524 may include at least one on-chip memory 1524'. In some aspects, the apparatus 1504 may further include one or more subscriber identity modules (SIM) cards 1520 and at least one application processor 1506 coupled to a secure digital (SD) card 1508 and a screen 1510. The application processor(s) 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor(s) 1524 communicates through the transceiver(s) 1522 via one or more antennas 1580 with the UE 104 and/or with an RU associated with a network entity 1502. The cellular baseband processor(s) 1524 and the application processor(s) 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor(s) 1524 and the application processor(s) 1506 are each responsible for general processing, including the execution of software stored on the computer-readable medium/memory. The software, when executed by the cellular baseband processor(s) 1524/application processor(s) 1506, causes the cellular baseband processor(s) 1524/application processor(s) 1506 to perform the various functions described supra. The computer-readable medium/memory may also be used for storing data that is manipulated by the cellular baseband processor(s) 1524/application processor(s) 1506 when executing software. The cellular baseband processor(s) 1524/application processor(s) 1506 may be a component of the UE 350 and may include the at least one memory 360 and/or at least one of the TX processor 368, the RX processor 356, and the controller/processor 359. In one configuration, the apparatus 1504 may be at least one processor chip (modem and/or application) and include just the cellular baseband processor (s) 1524 and/or the application processor(s) 1506, and in another configuration, the apparatus 1504 may be the entire UE (e.g., see UE 350 of FIG. 3) and include the additional modules of the apparatus 1504.

As discussed supra, the missing SSR component 198 may be configured to obtain a set of SSR error correction components associated with a set of SVs, where the set of SSR error correction components includes a first number of SSR error correction components that is less than a second number of SSR error correction components in a full set of SSR error correction components. The missing SSR component 198 may be configured to generate, based on the set of SSR error correction components, (1) an OSR of GNSS measurements associated with the set of SVs and (2) an OSR uncertainty value for the OSR. The missing SSR component 198 may be configured to compute, based on the OSR of the GNSS measurements and the OSR uncertainty value, a position of the GNSS wireless device. The missing SSR component 198 may be configured to output an indication of the position of the GNSS wireless device. The missing SSR component 198 may be configured to calculate an update to the position of the GNSS wireless device. The missing SSR component 198 may be configured to receive, from a server, a second set of SSR error correction components associated with a presurvey corresponding to a server-assisted mode, where generating the OSR uncertainty value with the URA value comprises generating the URA value based on the second set of SSR error correction components. The missing SSR component 198 may be within the cellular baseband processor(s) 1524, the application processor(s) 1506, or both the cellular baseband processor(s) 1524 and the application processor(s) 1506. The missing SSR component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination.

As shown, the apparatus 1504 may include a variety of components configured for various functions. In one configuration, the apparatus 1504, and in particular the cellular baseband processor(s) 1524 and/or the application processor(s) 1506, may include means for obtaining a set of state-space representation (SSR) error correction components associated with a set of space vehicles (SVs), where the set of SSR error correction components includes a first number of SSR error correction components that is less than a second number of SSR error correction components in a full set of SSR error correction components. In one configuration, the apparatus 1504, and in particular the cellular baseband processor(s) 1524 and/or the application processor(s) 1506, may include means for generating, based on the set of SSR error correction components, (1) an observation-space representation (OSR) of GNSS measurements associated with the set of SVs and (2) an OSR uncertainty value for the OSR. In one configuration, the apparatus 1504, and in particular the cellular baseband processor(s) 1524 and/or the application processor(s) 1506, may include means for computing, based on the OSR of the GNSS measurements and the OSR uncertainty value, a position of the GNSS wireless device. In one configuration, the apparatus 1504, and in particular the cellular baseband processor(s) 1524 and/or the application processor(s) 1506, may include means for outputting an indication of the position of the GNSS wireless device. In one configuration, the apparatus 1504, and in particular the cellular baseband processor(s) 1524 and/or the application processor(s) 1506, may include means for calculating an update to the position of the GNSS wireless device. In one configuration, the apparatus 1504, and in particular the cellular baseband processor(s) 1524 and/or the application processor(s) 1506, may include means for receiving, from a server, a second set of SSR error correction components associated with a presurvey corresponding to a server-assisted mode, where generating the OSR uncertainty value with the URA value includes generating the URA value based on the second set of SSR error correction components. The means may be the missing SSR component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

A global navigation satellite system (GNSS) may refer to a system that uses satellites (i.e., space vehicles (SVs)) to provide positioning, navigation, and timing (PNT) services to GNSS wireless devices (e.g., user equipments (UEs)) on a global or regional basis. The SVs may transmit signals that may be received by a GNSS wireless device, the GNSS wireless device may measure the signals, and the GNSS wireless device may compute its position on a celestial body (e.g., the Earth) based on the measured signals and other information. The computed position may be subject to various errors caused by the SVs and/or the Earth's atmosphere. The GNSS wireless device may be provided with error correction data that the GNSS wireless device may use to correct the computed position so as to increase an accuracy of the computed position. Examples of error correction data may include state-space representation (SSR) error correction components and an observation-space representation (OSR). SSR error correction components may represent errors that affect positioning as parameters of state vectors, while the OSR may be a "lump sum" of error components represented in observation space. In some cases, a full set of SSR error correction components may not be available to a GNSS wireless device due to a data service outage or a data traffic outage. The GNSS wireless device may wait until a full set of SSR error correction components are available. This approach may be suitable for positioning applications that allow for postprocessing and/or allow for a long convergence time. However, this approach may not be suitable for positioning applications that do not allow for a long convergence time Various technologies pertaining to missing SSR handling with URA are described herein. With more particularity, in one aspect, a GNSS wireless device may generate OSR with available SSR error correction components and the GNSS wireless device may generate an OSR uncertainty value with a relatively higher inflated user range accuracy (URA) value. In another aspect, a GNSS wireless device may generate OSR with available SSR error correction components and the GNSS wireless device may generate an OSR uncertainty value with a relatively lower inflated URA value. The SSR modelling may be data-free (i.e., empirical/physical modeling) in order to compensate for full uncertainty or the SSR modelling may be data-based (e.g., using an SSR data streaming trend (prediction using polynomial fitting) presurvey with a precise product).

In an example, a GNSS wireless device obtains a set of SSR error correction components associated with a set of SVs, where the set of SSR error correction components includes a first number of SSR error correction components that is less than a second number of SSR error correction components in a full set of SSR error correction components. The GNSS wireless device generates, based on the set of SSR error correction components, (1) an OSR of GNSS measurements associated with the set of SVs and (2) an OSR uncertainty value for the OSR. The GNSS wireless device computes, based on the OSR of the GNSS measurements and the OSR uncertainty value, a position of the GNSS wireless device. The GNSS wireless device outputs an indication of the position of the GNSS wireless device. Vis-à-vis generating, based on the set of SSR error correction components. (1) the OSR of GNSS measurements associated with the set of SVs and (2) the OSR uncertainty value for the OSR, the GNSS wireless device may be able to ascertain its position in a relatively faster manner compared to a GNSS wireless device that skips OSR generation. For instance, the GNSS wireless device may perform precise point positioning (PPP) and/or real-time kinematic positioning (RTK) in a relatively fast manner using the generated OSR.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B. A and C. B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 a method of wireless communication at a global navigation satellite system (GNSS) wireless device, including: obtaining a set of state-space representation (SSR) error correction components associated with a set of space vehicles (SVs), wherein the set of SSR error correction components includes a first number of SSR error correction components that is less than a second number of SSR error correction components in a full set of SSR error correction components; generating, based on the set of SSR error correction components, (1) an observation-space representation (OSR) of GNSS measurements associated with the set of SVs and (2) an OSR uncertainty value for the OSR; computing, based on the OSR of the GNSS measurements and the OSR uncertainty value, a position of the GNSS wireless device; and outputting an indication of the position of the GNSS wireless device.

Aspect 2 is the method of aspect 1, further including: calculating an update to the position of the GNSS wireless device.

Aspect 3 is the method of aspect 2, wherein calculating the update to the position of the GNSS wireless device includes: calculating a first correction to the position of the GNSS wireless device; or calculating a second correction to a GNSS measurement associated with the position of the GNSS wireless device.

Aspect 4 is the method of any of aspects 1-3, wherein generating the OSR uncertainty value for the OSR includes: generating the OSR uncertainty value with a user range accuracy (URA) value.

Aspect 5 is the method of aspect 4, wherein generating the OSR uncertainty value with the URA value includes generating the URA value based on a ranging model.

Aspect 6 is the method of aspect 5, wherein the ranging model includes a pseudorange model, a carrier phase model, or a Doppler model.

Aspect 7 is the method of any of aspects 5-6, wherein generating the URA value based on the ranging model includes generating the URA value based on at least one of an SV position value of the ranging model, an SV clock bias value of the ranging model, a code bias value of the ranging model, a fractional cycle bias value of the ranging model, a carrier phase bias value of the ranging model, an ionospheric delay value of the ranging model, or a tropospheric delay value of the ranging model.

Aspect 8 is the method of aspect 4, wherein generating the OSR includes: generating the OSR based on the set of SSR error correction components and an empirical model.

Aspect 9 is the method of aspect 8, wherein the empirical model includes at least one of a total group delay (TGD) and inter-signal bias model, an ionospheric delay model, or a tropospheric delay model.

Aspect 10 is the method of any of aspects 8-9, wherein generating the OSR includes generating the OSR further based on a second set of SSR error correction components, wherein the second set of SSR error correction components predates the set of SSR error correction components.

Aspect 11 is the method of aspect 10, wherein generating the OSR uncertainty value with the URA value includes generating the URA value based on the set of SSR error correction components, the second set of SSR error correction components, and a second URA value associated with the second set of SSR error correction components.

Aspect 12 is the method of any of aspects 8-11, wherein generating the OSR uncertainty value with the URA value includes generating the URA value based on an internal uncertainty model of the empirical model.

Aspect 13 is the method of aspect 4, wherein generating the OSR includes: generating the OSR based on the set of SSR error correction components and a prediction model.

Aspect 14 is the method of aspect 13, wherein generating the OSR based on the set of SSR error correction components and the prediction model includes performing at least one of an interpolation or an extrapolation based on the set of SSR error correction components and the prediction model.

Aspect 15 is the method of any of aspects 13-14, further including: receiving, from a server, a second set of SSR error correction components associated with a presurvey corresponding to a server-assisted mode, wherein generating the OSR uncertainty value with the URA value includes generating the URA value based on the second set of SSR error correction components.

Aspect 16 is the method of any of aspects 1-15, wherein outputting the indication of the computed position of the GNSS wireless device includes at least one of: storing the indication of the computed position of the GNSS wireless device in at least one of a memory, a buffer, or a cache; or transmitting the indication of the computed position of the GNSS wireless device.

Aspect 17 is the method of any of aspects 1-16, wherein the OSR is associated with a sum of error correction components, and wherein the set of SSR error correction components is associated with at least one parameter of at least one state vector.

Aspect 18 is the method of any of aspects 1-17, wherein generating the OSR of the GNSS measurements includes: defining a virtual reference station (VRS) coordinate corresponding to the OSR, wherein generating the OSR of the GNSS measurements includes generating the OSR of the GNSS measurements further based on the VRS coordinate.

Aspect 19 is the method of any of aspects 1-18, wherein the OSR of the GNSS measurements is associated with at least one of a physical GNSS wireless device or a virtual GNSS wireless device.

Aspect 20 is an apparatus for wireless communication at a global navigation satellite system (GNSS) wireless device comprising at least one memory and at least one processor coupled to the at least one memory and, based at least in part on information stored in the at least one memory, the at least one processor, individually or in any combination, is configured to implement a method as in any of aspects 1-19.

Aspect 21 is the apparatus of aspect previous, further comprising at least one of a transceiver or an antenna coupled to the at least one processor, wherein to obtain the set of SSR error correction components via at least one of the transceiver or the antenna, the at least one processor, individually or in any combination, is configured to obtain the set of SSR error correction components via at least one of the transceiver or the antenna via at least one of the transceiver or the antenna.

Aspect 22 is an apparatus for wireless communication, further comprising means for performing a method as in any of aspects 1-19.

Aspect 23 is a computer-readable medium (e.g., a non-transitory computer-readable medium) storing computer executable code, the computer executable code, when executed by at least one processor, causes the at least one processor to implement a method as in any of aspects 1-19.

What is claimed is:

1. An apparatus for wireless communication at a global navigation satellite system (GNSS) wireless device, comprising:

at least one memory; and at least one processor coupled to the at least one memory and, based at least in part on information stored in the at least one memory, the at least one processor is configured to:

obtain a set of state-space representation (SSR) error correction components associated with a set of space vehicles (SVs), wherein the set of SSR error correction components includes a first number of SSR error correction components that is less than a second number of SSR error correction components in a full set of SSR error correction components;

receive, from a server, a second set of SSR error correction components associated with a presurvey corresponding to a server-assisted mode;

generate, based on the set of SSR error correction components and the second set of SSR error correction components, (1) an observation-space representation (OSR) of GNSS measurements associated with the set of SVs and (2) an OSR uncertainty value for the OSR, wherein the OSR uncertainty value is based on a user range accuracy (URA) value, and wherein the URA value is based on the second set of SSR error correction components;

compute, based on the OSR of the GNSS measurements and the OSR uncertainty value, a position of the GNSS wireless device; and output an indication of the position of the GNSS wireless device.

2. The apparatus of claim 1, wherein the at least one processor is further configured to:

calculate an update to the position of the GNSS wireless device.

3. The apparatus of claim 2, wherein to calculate the update to the position of the GNSS wireless device, the at least one processor is configured to:

calculate a first correction to the position of the GNSS wireless device; or calculate a second correction to a GNSS measurement associated with the position of the GNSS wireless device.

4. The apparatus of claim 1, wherein to generate the OSR uncertainty value with the URA value, the at least one processor is configured to:

generate the URA value based on a ranging model.

5. The apparatus of claim 4, wherein the ranging model comprises a pseudorange model, a carrier phase model, or a Doppler model.

6. The apparatus of claim 4, wherein to generate the URA value based on the ranging model, the at least one processor is configured to:

generate the URA value based on at least one of an SV position value of the ranging model, an SV clock bias value of the ranging model, a code bias value of the ranging model, a fractional cycle bias value of the ranging model, a carrier phase bias value of the ranging model, an ionospheric delay value of the ranging model, or a tropospheric delay value of the ranging model.

7. The apparatus of claim 1, wherein to generate the OSR, the at least one processor is configured to:

generate the OSR based on the set of SSR error correction components and an empirical model.

8. The apparatus of claim 7, wherein the empirical model comprises at least one of a total group delay (TGD) and inter-signal bias model, an ionospheric delay model, or a tropospheric delay model.

9. The apparatus of claim 7, wherein to generate the OSR, the at least one processor is configured to:

generate the OSR further based on the second set of SSR error correction components, wherein the second set of SSR error correction components predates the set of SSR error correction components.

10. The apparatus of claim 9, wherein to generate the OSR uncertainty value with the URA value, the at least one processor is configured to:

generate the URA value based on the set of SSR error correction components, the second set of SSR error correction components, and a second URA value associated with the second set of SSR error correction components.

11. The apparatus of claim 7, wherein to generate the OSR uncertainty value with the URA value, the at least one processor is configured to generate the URA value based on an internal uncertainty model of the empirical model.

12. The apparatus of claim 1, wherein to generate the OSR, the at least one processor is configured to:

generate the OSR based on the set of SSR error correction components and a prediction model.

13. The apparatus of claim 12, wherein to generate the OSR based on the set of SSR error correction components and the prediction model, the at least one processor is configured to:

perform at least one of an interpolation or an extrapolation based on the set of SSR error correction components and the prediction model.

14. The apparatus of claim 1, wherein to output the indication of the position of the GNSS wireless device, the at least one processor is configured to:

store the indication of the position of the GNSS wireless device in at least one of the memory, a buffer, or a cache.

15. The apparatus of claim 1, wherein to output the indication of the position of the GNSS wireless device, the at least one processor is configured to:

transmit the indication of the position of the GNSS wireless device.

16. The apparatus of claim 1, wherein the OSR is associated with a sum of error correction components, and wherein the set of SSR error correction components is associated with at least one parameter of at least one state vector.

17. The apparatus of claim 1, wherein to generate the OSR of the GNSS measurements, the at least one processor is configured to:

define a virtual reference station (VRS) coordinate corresponding to the OSR, wherein to generate the OSR of the GNSS measurements, the at least one processor is configured to generate the OSR of the GNSS measurements further based on the VRS coordinate.

18. The apparatus of claim 1, wherein the OSR of the GNSS measurements is associated with at least one of a physical GNSS wireless device or a virtual GNSS wireless device.

19. The apparatus of claim 1, further comprising at least one of a transceiver or an antenna coupled to the at least one processor, wherein to obtain the set of SSR error correction components, the at least one processors is configured to obtain the set of SSR error correction components via at least one of the transceiver or the antenna.

20. A method of wireless communication at a global navigation satellite system (GNSS) wireless device, comprising:

obtaining a set of state-space representation (SSR) error correction components associated with a set of space vehicles (SVs), wherein the set of SSR error correction components includes a first number of SSR error correction components that is less than a second number of SSR error correction components in a full set of SSR error correction components;

receiving, from a server, a second set of SSR error correction components associated with a presurvey corresponding to a server-assisted mode;

generating, based on the set of SSR error correction components and the second set of SSR error correction components, (1) an observation-space representation (OSR) of GNSS measurements associated with the set of SVs and (2) an OSR uncertainty value for the OSR, wherein the OSR uncertainty value is based on a user range accuracy (URA) value, and wherein the URA value is based on the second set of SSR error correction components;

computing, based on the OSR of the GNSS measurements and the OSR uncertainty value, a position of the GNSS wireless device; and outputting an indication of the position of the GNSS wireless device.

21. The method of claim 20, further comprising:

calculating an update to the position of the GNSS wireless device.

22. The method of claim 21, wherein calculating the update to the position of the GNSS wireless device comprises:

calculating a first correction to the position of the GNSS wireless device; or calculating a second correction to a GNSS measurement associated with the position of the GNSS wireless device.

23. The method of claim 20, wherein generating the OSR uncertainty value with the URA value comprises generating the URA value based on a ranging model.

24. The method of claim 23, wherein the ranging model comprises a pseudorange model, a carrier phase model, or a Doppler model.

25. The method of claim 23, wherein generating the URA value based on the ranging model comprises generating the URA value based on at least one of an SV position value of the ranging model, an SV clock bias value of the ranging model, a code bias value of the ranging model, a fractional cycle bias value of the ranging model, a carrier phase bias value of the ranging model, an ionospheric delay value of the ranging model, or a tropospheric delay value of the ranging model.

26. An apparatus for wireless communication at a global navigation satellite system (GNSS) wireless device, comprising:

means for obtaining a set of state-space representation (SSR) error correction components associated with a set of space vehicles (SVs), wherein the set of SSR error correction components includes a first number of SSR error correction components that is less than a second number of SSR error correction components in a full set of SSR error correction components;

means for receiving, from a server, a second set of SSR error correction components associated with a presurvey corresponding to a server-assisted mode;

means for generating, based on the set of SSR error correction components and the second set of SSR error correction components, based on the set of SSR error correction components, (1) an observation-space representation (OSR) of GNSS measurements associated with the set of SVs and (2) an OSR uncertainty value for the OSR, wherein the OSR uncertainty value is based on a user range accuracy (URA) value, and wherein the URA value is based on the second set of SSR error correction components;

means for computing, based on the OSR of the GNSS measurements and the OSR uncertainty value, a position of the GNSS wireless device; and means for outputting an indication of the position of the GNSS wireless device.

27. A non-transitory computer-readable medium storing computer executable code at a global navigation satellite system (GNSS) wireless device, the computer executable code, when executed by at least one processor, causes the at least one processor to:

obtain a set of state-space representation (SSR) error correction components associated with a set of space vehicles (SVs), wherein the set of SSR error correction components includes a first number of SSR error correction components that is less than a second number of SSR error correction components in a full set of SSR error correction components;

receive, from a server, a second set of SSR error correction components associated with a presurvey corresponding to a server-assisted mode;

generate, based on the set of SSR error correction components and the second set of SSR error correction components, based on the set of SSR error correction components, (1) an observation-space representation (OSR) of GNSS measurements associated with the set of SVs and (2) an OSR uncertainty value for the OSR, wherein the OSR uncertainty value is based on a user range accuracy (URA) value, and wherein the URA value is based on the second set of SSR error correction components;

compute, based on the OSR of the GNSS measurements and the OSR uncertainty value, a position of the GNSS wireless device; and output an indication of the position of the GNSS wireless device.

* * * * *